US007251629B1

(12) United States Patent (10) Patent No.: US 7,251,629 B1
Marynowski et al. (45) Date of Patent: Jul. 31, 2007

(54) AUTOMATED TRADING SYSTEM IN AN ELECTRONIC TRADING EXCHANGE

(75) Inventors: John M. Marynowski, Amherst, NY (US); Catalin D. Voinescu, Brasov (RO); Stefan Puscasu, Brasov (RO); Thomas M. O'Donnell, Woodstock, IL (US)

(73) Assignee: Edge Capture, LLC, Woodstock, IL (US)

( * ) Notice: Subject to any disclaimer, the term of this patent is extended or adjusted under 35 U.S.C. 154(b) by 0 days.

(21) Appl. No.: 09/417,774

(22) Filed: Oct. 14, 1999

(51) Int. Cl.
*G06F 17/60* (2006.01)
(52) U.S. Cl. .............................. 705/37; 705/36; 705/38; 235/379; 235/380; 340/825.6
(58) Field of Classification Search .................. 705/37, 705/35, 26
See application file for complete search history.

(56) References Cited

U.S. PATENT DOCUMENTS

| | | | |
|---|---|---|---|
| 2,046,381 A * | 7/1936 | Hicks et al. ................. | 177/353 |
| 3,082,402 A * | 3/1963 | Scantlin ....................... | 340/152 |
| 3,296,597 A * | 1/1967 | Scantlin et al. .......... | 340/172.5 |
| 3,573,747 A * | 4/1971 | Adams et al. ................. | 705/37 |
| 4,412,287 A * | 10/1983 | Braddock, III ............... | 705/37 |
| 4,674,044 A * | 6/1987 | Kalmus et al. ............. | 364/408 |
| 4,903,201 A * | 2/1990 | Wagner ........................ | 705/37 |
| 5,038,284 A * | 8/1991 | Kramer ........................ | 705/37 |
| 5,063,507 A * | 11/1991 | Lindsey et al. ............. | 364/408 |
| 5,101,353 A * | 3/1992 | Lupien et al. .............. | 364/408 |
| 5,315,634 A * | 5/1994 | Tanaka et al. ............ | 379/93.02 |
| 5,500,793 A * | 3/1996 | Deming, Jr. et al. ........ | 364/401 |
| 5,870,730 A * | 2/1999 | Furuya et al. ................. | 706/47 |

(Continued)

FOREIGN PATENT DOCUMENTS

| | | | |
|---|---|---|---|
| EP | 0573991 A1 | * | 6/1993 |
| WO | WO9010910 | * | 9/1990 |
| WO | WO9737735 | * | 10/1997 |

OTHER PUBLICATIONS

Barone-Asesi, G and Whaley. R., "Efficient Analytic Approximation of American Option Values" Journal of Finance. vol. 42, No. 2 (Jun. 1987), 301-320.*
Web-Pop (Professional Options Package) (www.pmpublishing.com).*

*Primary Examiner*—Vincent Millin
*Assistant Examiner*—David S Felten
(74) *Attorney, Agent, or Firm*—Morgan Lewis & Bockius LLP

(57) ABSTRACT

An electronic exchange system network includes a trader site having an automated trading system capable of submitting orders to an exchange site. The automated trading system determines whether an order should be submitted based on, for example, the current market price of an option and theoretical buy and sell prices. The theoretical buy and sell prices are derived from, among other things, the current market price of the security underlying the option. A look-up table stores a range of theoretical buy and sell prices for a given range of current market price of the underlying security. Accordingly, as the price of the underlying security changes, a new theoretical price may be indexed in the look-up table, thereby avoiding calculations that would otherwise slow automated trading decisions. Other techniques may be used in addition or in the alternative to speed automatic decision-making. In addition, a system of checks may be conducted to ensure accurate and safe automated trading. The automated trading system may be capable of automatically submitting orders in connection with the underlying security in order to hedge part of the delta risk associated with the automated option trades.

46 Claims, 8 Drawing Sheets

U.S. PATENT DOCUMENTS

| | | | |
|---|---|---|---|
| 5,884,286 A * | 3/1999 | Daughtery, III | 705/36 R |
| 5,963,923 A | 10/1999 | Garber | 70/37 |
| 6,016,483 A * | 1/2000 | Rickard et al. | 705/36 R |
| 6,058,391 A * | 5/2000 | Gardner | 707/4 |
| 6,061,662 A * | 5/2000 | Makivic | 705/36 R |
| 6,173,270 B1 * | 1/2001 | Cristofich et al. | 705/37 |
| 6,236,980 B1 * | 5/2001 | Reese | 705/36 |
| 6,263,321 B1 * | 7/2001 | Daughtery, III | 705/36 R |
| 6,304,858 B1 * | 10/2001 | Mosler et al. | 705/37 |
| 6,317,728 B1 * | 11/2001 | Kane | 705/36 R |
| 6,415,269 B1 * | 7/2002 | Dinwoodie | 705/37 |
| 6,546,375 B1 * | 4/2003 | Pang et al. | 705/37 |
| 6,594,643 B1 * | 7/2003 | Freeny, Jr. | 705/36 R |
| 6,839,686 B1 * | 1/2005 | Galant | 705/36 R |

* cited by examiner

THEORETICAL PRICE LOOK-UP TABLE 435

ASSUMPTIONS OF INPUT VARIABLES FOR THEORETICAL PRICES
(2) RISK FREE INTEREST RATE = 3.0% PER ANNUM
(3) VOLATILITY OF THE UNDERLYING SECURITY = 32.0% PER ANNUM
(4) EXPECTED DIVIDEND STREAM = A DIVIDEND OF $10.00, PAYABLE IN 77 DAYS (AUGUST 19 MINUS JUNE 03)
(5) TIME UNTIL OPTION EXPIRATION = 109 DAYS (SEPTEMBER 20 MINUS JUNE 03)
(6) CAN BE EXERCISED EARLY = YES = AMERICAN STYLE OPTION
(7) IS THE OPTION A CALL OR PUT = CALL

| UNDERLYING PRICE | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| STRIKE | 75.0 | 75.1 | 75.2 | 75.3 | 75.4 | 75.5 | 75.6 | 75.7 | 75.8 | 75.9 | 76.0 | 76.1 | 76.2 | 76.3 | 76.4 | 76.5 | 76.6 | 76.7 | 76.8 | 76.9 | 77.0 | 77.1 | 77.2 | 77.3 | 77.4 | 77.5 | 77.6 | 77.7 | 77.8 |
| 50.0 | 25.17 | 25.27 | 25.37 | 25.47 | 25.57 | 25.67 | 25.77 | 25.87 | 25.97 | 26.07 | 26.17 | 26.27 | 26.37 | 26.47 | 26.57 | 26.67 | 26.77 | 26.87 | 26.97 | 27.07 | 27.17 | 27.27 | 27.37 | 27.47 | 27.57 | 27.67 | 27.77 | 27.87 | 27.97 |
| 52.5 | 22.70 | 22.80 | 22.90 | 23.00 | 23.10 | 23.20 | 23.30 | 23.40 | 23.50 | 23.59 | 23.69 | 23.79 | 23.89 | 23.99 | 24.09 | 24.19 | 24.29 | 24.39 | 24.49 | 24.59 | 24.69 | 24.79 | 24.89 | 24.99 | 25.09 | 25.19 | 25.29 | 25.39 | 25.49 |
| 55.0 | 20.24 | 20.34 | 20.44 | 20.54 | 20.64 | 20.74 | 20.84 | 20.94 | 21.04 | 21.13 | 21.23 | 21.33 | 21.43 | 21.53 | 21.63 | 21.73 | 21.83 | 21.93 | 22.03 | 22.13 | 22.23 | 22.32 | 22.42 | 22.52 | 22.62 | 22.72 | 22.82 | 22.92 | 23.02 |
| 57.5 | 17.83 | 17.92 | 18.02 | 18.12 | 18.22 | 18.31 | 18.41 | 18.51 | 18.61 | 18.71 | 18.81 | 18.90 | 19.00 | 19.10 | 19.20 | 19.30 | 19.40 | 19.49 | 19.59 | 19.69 | 19.79 | 19.89 | 19.99 | 20.08 | 20.18 | 20.28 | 20.38 | 20.48 | 20.58 |
| 60.0 | 15.46 | 15.57 | 15.67 | 15.76 | 15.86 | 15.95 | 16.04 | 16.14 | 16.23 | 16.33 | 16.42 | 16.52 | 16.62 | 16.71 | 16.81 | 16.91 | 17.00 | 17.10 | 17.20 | 17.29 | 17.39 | 17.49 | 17.58 | 17.68 | 17.78 | 17.87 | 17.97 | 18.07 | 18.16 |
| 62.5 | 13.21 | 13.30 | 13.39 | 13.49 | 13.58 | 13.67 | 13.76 | 13.85 | 13.94 | 14.03 | 14.13 | 14.22 | 14.32 | 14.41 | 14.51 | 14.60 | 14.69 | 14.79 | 14.88 | 14.98 | 15.07 | 15.17 | 15.26 | 15.35 | 15.45 | 15.54 | 15.64 | 15.73 | 15.83 |
| 65.0 | 11.09 | 11.16 | 11.26 | 11.35 | 11.44 | 11.52 | 11.61 | 11.69 | 11.76 | 11.87 | 11.95 | 12.04 | 12.12 | 12.21 | 12.30 | 12.39 | 12.48 | 12.57 | 12.66 | 12.76 | 12.85 | 12.94 | 13.03 | 13.12 | 13.21 | 13.30 | 13.39 | 13.48 | 13.57 |
| 67.5 | 9.12 | 9.20 | 9.28 | 9.36 | 9.44 | 9.52 | 9.60 | 9.68 | 9.76 | 9.84 | 9.92 | 10.01 | 10.09 | 10.16 | 10.26 | 10.35 | 10.44 | 10.52 | 10.61 | 10.69 | 10.78 | 10.86 | 10.95 | 11.03 | 11.12 | 11.20 | 11.29 | 11.37 | 11.46 |
| 70.0 | 7.36 | 7.43 | 7.50 | 7.58 | 7.65 | 7.72 | 7.79 | 7.86 | 7.93 | 8.00 | 8.08 | 8.16 | 8.24 | 8.31 | 8.39 | 8.47 | 8.55 | 8.63 | 8.70 | 8.79 | 8.86 | 8.94 | 9.02 | 9.10 | 9.17 | 9.25 | 9.33 | 9.41 | 9.49 |
| 72.5 | 5.80 | 5.86 | 5.93 | 5.99 | 6.05 | 6.11 | 6.18 | 6.25 | 6.32 | 6.39 | 6.46 | 6.53 | 6.60 | 6.67 | 6.74 | 6.81 | 6.88 | 6.95 | 7.02 | 7.09 | 7.16 | 7.23 | 7.30 | 7.37 | 7.44 | 7.51 | 7.58 | 7.65 | 7.72 |
| 75.0 | 4.46 | 4.51 | 4.57 | 4.62 | 4.69 | 4.75 | 4.81 | 4.87 | 4.93 | 4.99 | 5.05 | 5.11 | 5.17 | 5.23 | 5.29 | 5.35 | 5.41 | 5.47 | 5.53 | 5.59 | 5.65 | 5.71 | 5.78 | 5.84 | 5.90 | 5.96 | 6.02 | 6.08 | 6.15 |
| 77.5 | 3.36 | 3.41 | 3.46 | 3.51 | 3.56 | 3.61 | 3.66 | 3.71 | 3.76 | 3.81 | 3.86 | 3.91 | 3.96 | 4.01 | 4.06 | 4.11 | 4.16 | 4.21 | 4.27 | 4.32 | 4.37 | 4.42 | 4.47 | 4.52 | 4.57 | 4.62 | 4.68 | 4.73 | 4.78 |
| 80.0 | 2.47 | 2.51 | 2.55 | 2.59 | 2.63 | 2.67 | 2.71 | 2.75 | 2.79 | 2.83 | 2.87 | 2.91 | 2.95 | 3.00 | 3.04 | 3.08 | 3.12 | 3.16 | 3.20 | 3.24 | 3.29 | 3.33 | 3.37 | 3.41 | 3.46 | 3.51 | 3.56 | 3.61 | 3.66 |
| 82.5 | 1.76 | 1.79 | 1.82 | 1.85 | 1.88 | 1.91 | 1.94 | 1.97 | 2.01 | 2.04 | 2.07 | 2.10 | 2.13 | 2.16 | 2.20 | 2.23 | 2.26 | 2.30 | 2.34 | 2.38 | 2.42 | 2.46 | 2.50 | 2.54 | 2.58 | 2.62 | 2.66 | 2.70 | 2.74 |
| 85.0 | 1.21 | 1.23 | 1.25 | 1.28 | 1.30 | 1.32 | 1.34 | 1.37 | 1.39 | 1.41 | 1.44 | 1.46 | 1.49 | 1.52 | 1.55 | 1.58 | 1.61 | 1.65 | 1.68 | 1.71 | 1.74 | 1.77 | 1.80 | 1.83 | 1.86 | 1.89 | 1.92 | 1.95 | 1.98 |
| 87.5 | 0.77 | 0.79 | 0.81 | 0.83 | 0.85 | 0.88 | 0.90 | 0.92 | 0.94 | 0.96 | 0.99 | 1.01 | 1.03 | 1.05 | 1.07 | 1.10 | 1.12 | 1.14 | 1.16 | 1.18 | 1.21 | 1.23 | 1.25 | 1.27 | 1.30 | 1.32 | 1.34 | 1.37 | 1.39 |
| 90.0 | 0.47 | 0.49 | 0.50 | 0.52 | 0.53 | 0.55 | 0.56 | 0.58 | 0.59 | 0.61 | 0.62 | 0.64 | 0.65 | 0.67 | 0.68 | 0.70 | 0.72 | 0.73 | 0.75 | 0.77 | 0.78 | 0.80 | 0.81 | 0.83 | 0.85 | 0.87 | 0.88 | 0.90 | 0.94 |
| 92.5 | 0.27 | 0.27 | 0.28 | 0.29 | 0.30 | 0.31 | 0.32 | 0.33 | 0.34 | 0.35 | 0.36 | 0.37 | 0.38 | 0.39 | 0.40 | 0.41 | 0.42 | 0.43 | 0.45 | 0.46 | 0.48 | 0.49 | 0.51 | 0.52 | 0.54 | 0.55 | 0.57 | 0.58 | 0.60 |
| 95.0 | 0.10 | 0.10 | 0.11 | 0.12 | 0.12 | 0.13 | 0.14 | 0.15 | 0.16 | 0.17 | 0.18 | 0.19 | 0.20 | 0.21 | 0.22 | 0.23 | 0.24 | 0.25 | 0.26 | 0.27 | 0.28 | 0.29 | 0.29 | 0.30 | 0.31 | 0.32 | 0.33 | 0.34 | 0.35 |
| 97.5 | 0.00 | 0.00 | 0.00 | 0.01 | 0.01 | 0.02 | 0.02 | 0.03 | 0.03 | 0.04 | 0.05 | 0.05 | 0.06 | 0.07 | 0.07 | 0.08 | 0.08 | 0.09 | 0.10 | 0.10 | 0.11 | 0.12 | 0.12 | 0.13 | 0.14 | 0.14 | 0.15 | 0.16 | 0.17 |

AUTOMATED TRADING SYSTEM IN AN ELECTRONIC TRADING EXCHANGE

BACKGROUND OF THE INVENTION

1. Field of the Invention

The present invention relates to an automated trading system for use in an electronic trading exchange network system and, more particularly, a trading system that rapidly, accurately, and safely responds to desirable trading opportunities.

2. Description of the Related Art

Trading exchanges historically provided a location for buyers and sellers to meet to trade stocks, bonds, currencies, commodities, and other items. The New York Stock Exchange and the Chicago Mercantile Exchange are examples of such trading exchanges. Recent advances in computer and communications technology have led to electronic trading exchange system networks. Electronic trading exchange system networks use communications networks and computers to replicate traditional face-to-face exchange functions. For example, centralized exchange computers disseminate market information, maintain records and statistics, settle cash payments, determine risk based margin requirements, and match trades. Matching of trades is typically done on a first come-first served basis, whereby time of order entry is an important criterion for determining priority in fulfillment of a transaction.

A communications network connects the exchange computers to numerous trader sites. Each trader site includes one or more trader stations operated by traders. Exchange network operators typically provide exchange members with interface software and, in some cases, hardware to enable traders to view prices and other information relating to products, and to execute transactions by submitting orders and quotes. This trading information is displayed in a grid or other organized format. Market competition is fierce. Traders who can quickly identify opportunities and act on them generate the largest profits.

Most trader stations in use today rely upon the traders themselves to decide whether to submit an order in response to a trading opportunity presented through the exchange. In this regard, the trading information is received from the exchange, processed, and displayed on a monitor of the trader's station. The trader reads the trading information from the monitor and decides whether or not to submit an order. The trader submits an order by entering instructions into the trader station using a keyboard or mouse.

Attempts have been made to implement trading systems that automate decision-making so that orders may be submitted with limited trader interaction. These systems have a number of drawbacks. For example, user-friendly systems that automatically submit orders without trader interaction, while faster than a human trader, are relatively slow in terms of computer speed due to application and system design. In a typical set-up, trading information received from the exchange is processed by general purpose backend computer equipment. The backend computer may, among other things, (1) act as a gateway by communicating market information from the exchange to various types of client equipment, (2) submit, delete, and modify orders and quotes to the exchange from the various client equipment, (3) receive real-time trade confirmations and end-of-day back office reports, and (4) perform risk analysis, position management, and accounting functions. The trader stations are clients of the backend computer. The trader stations may be tasked with numerous functions, such as (1) receiving and displaying real-time market information, (2) creating and displaying theoretical prices related to market products, (3) composing, submitting, modifying, and deleting orders and quotes, (4) maintaining positions and calculating risk management, to name a few. Each trader station is typically configured in a very user-friendly, Windows-based environment since the trader will spend long periods of time each day watching and interacting with it. The overhead associated with the functions performed by the backend computer and the trader stations reduces the response speed of automated trading.

In addition, computer equipment lacks the trading judgment of a human trader. A computer can generate staggering losses in the blink of an eye by submitting orders based upon incomplete or mistaken assumptions inherent in the trading program, erroneous input data, or corrupted data relied upon by the trading program. Accordingly, there exists a need in the art for an automated trading system that rapidly responds to trade information transmitted from an exchange, yet is safe and accurate.

SUMMARY OF THE INVENTION

The present invention has been made in view of the above circumstances and has as an object to provide an improved trading system that rapidly responds to trading information received from an exchange.

A further object of the invention is to provide an automated trading system in an electronic trading exchange system that rapidly submits orders in response to trading information received from the exchange.

A further object of the invention is to provide an automated trading system that ensures the accuracy of automatic trading operations.

A further object of the invention is to provide an automated trading system that performs automatic trading operations without the risk of enormous losses due to erroneous, mistaken and/or repeated operation.

A further object of the invention is to provide a trading system in an automated trader station that may be remotely controlled.

A further object of the invention is to provide an automated trader system that automatically hedges some or all of the delta risk associated with the execution of a trade by submitting an order in connection with another, related trade opportunity.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises an automated trading system for use in an electronic exchange system network that includes a receiver interface that receives market price information for a first traded item from an exchange, data reference logic that outputs a transaction value for the first traded item from a data structure based on price information for a second traded item related to the first traded item, decision logic using at least a portion of the received market price information and the transaction value to generate a decision whether to submit an order for the first traded item, and an output interface for outputting a request for market transaction for one of the first traded item and the second traded item for transmission to the exchange in response to the decision logic. By way of example, the first traded item may correspond to an option and the second traded item may correspond to a security underlying the option.

The data reference logic may receive current price information for the second traded item and uses the current price information to output the transaction value. The data reference logic may include memory storing the data structure, which maps pre-calculated transaction values of the first traded item over a range of price values of the second traded item, and reference logic for identifying one of the pre-calculated transaction values based at least in part on a current price value for the second traded item. The data structure may comprise one or more of a two-dimensional data structure mapping pre-calculated transaction values of the first traded item over a range of prices of the second traded item, an n-dimensional data structure, where n is 3 or more, a look-up table, a linked list, and/or a tree structure.

The decision logic may compare at least a portion of the received market price information to the transaction value when automated trading in the first item first becomes enabled. The automated trading system may also include safety check logic, responsive to the decision logic, to prevent transmission of a request for market transaction (or to cap the maximum quantity of the market transaction) for the first traded item to the exchange if the request does not meet a predetermined criterion, such as a maximum trade quantity for the first traded item or a maximum number of market transaction attempts within a predetermined period of time. The decision logic may compare at least a portion of the received market price information to the transaction value when the maximum number of attempts is increased.

The receiver interface may receive the market price information for the first traded item indirectly from the exchange via an exchange interface. Further, the decision logic may compare the transactional value to at least a portion of the received market price information, where the transaction value is a minimum sell price for the first traded item, and the market price information includes a market bid price for the first traded item. The transaction value may be a maximum buy price for the first traded item, and the market price information may include a market ask price for the first traded item. The transactional value may be a theoretical value of the first traded item based on a mathematical model.

The price information for the second traded item may correspond to a current market price for the second traded item. The decision logic may then generate a comparison when the current market price for the second traded item changes. Comparisons may additionally be generated when the current market price for the first traded item changes, when a table variable are updated or changed, when automated trading is enabled, and/or when safety checks are relaxed.

A backend computer may include the receiver interface, the data reference logic, the decision logic, and the output interface. The first backend computer may operate using a Windows-based operating system or a text-based operating system. A trader station separate from the backend computer may be coupled to the backend computer through a communication link. The trader station may include a graphic user interface to enable a trader to monitor the operation of the backend computer. The trader station may transmit updated data reference information for updating the data reference logic to the backend computer over the communication link. For example, the trader station can calculate the updated data reference information, which the backend computer stores. The backend computer may be located substantially closer than the trader station to the exchange that transmits the market price information for the first traded item.

The present invention further comprises an automated trading method for use in an electronic exchange system network, that includes receiving market price information for a first traded item, identifying a desired price for the first traded item in a look-up table based on price information for a second traded item related to the first traded item, comparing the received market price information for the first traded item to the desired price for the first traded item, and generating an order for one of the first traded item and the second traded item based on the comparison of the received market price information to the desired price.

The first traded item may correspond to an option and the second traded item may correspond to a security underlying the option. The step of identifying a desired price may include receiving current market price information for the second traded item, using that current market price information to index a desired price for the first traded item in the look-up table. The look-up table may be a two-dimensional table providing desired price values indexed by item traded and price of the second traded item or an n-dimensional table, where n is 3 or more.

The present invention further comprises an automated method of trading in an electronic exchange system network, comprising the steps of receiving a current market price for an option from an electronic exchange, comparing the current market price for the option with a desired price for the option, where the desired price is derived from current price information for an underlying security for the option, and submitting an order for the option to the electronic exchange within 1 millisecond of the step of receiving the current market price.

The step of submitting an order may be performed within 600 microseconds of the step of receiving the current market price, and even within 380 or 250 microseconds of the step of receiving the current market price.

The present invention further comprises an automated trading method for use in an electronic exchange system network, including the steps of receiving market information for a first traded item, identifying a transaction value for the first traded item in a look-up table based on at least one of price information for a second traded item related to the first traded item and received market information for the first traded value, and using at least the identified transaction value in determining whether to submit an order for the first traded item.

The identified transaction value may be an implied volatility value corresponding to the first traded item, a maximum buy value for the first traded item, a minimum sell value for the first traded item, or a theoretical value for the first traded item generated based on a mathematical model. Further, the look-up table may comprise a linked list.

The backend computer may perform the receiving, identifying, and using steps on a Windows-based operating system or on a text-based platform. A trader station separate from the backend computer may calculates transaction values for storage in the look-up table and transmit the calculated transaction values to the backend computer, which stores the calculated transaction values in the look-up table. The values stored in the look-up table of the backend computer may be checked against values stored in a look-up table in the trader station to confirm the accuracy of the look-up table stored in the backend computer.

Moreover, the method may further include submitting an order for the first traded item receiving confirmation of a transaction from an exchange responsive to the order submitted, and submitting an order for the second traded item to hedge a delta risk associated with the confirmed transaction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiment(s) of the invention and together with the description, serve to explain the principles of the invention.

FIG. 4 illustrates a representation of an embodiment of a theoretical price look-up table in accordance with the present invention.

DESCRIPTION OF THE PREFERRED EMBODIMENT

The present invention recognizes that electronic trading exchange system computers match buy and sell orders on a first come/first serve basis. Accordingly, the speed and accuracy of submitting orders or other responses is critical to the trader's ability to participate in the most profitable transactions. Even short delays in response may freeze a trader out of an otherwise lucrative transaction.

The present invention is capable of reducing the time it takes for the trader to submit an order in response to incoming trading information from the exchange. In accordance with one aspect of the present invention, the trader's computer equipment automatically decides whether or not to submit an order based upon a look-up table of trading information stored by the computer equipment and trading information received from the exchange computers. The look-up table, among other advantages, eliminates the need to recalculate decision information when trading conditions change. Recalculating decision information is time consuming, particularly when trading conditions change frequently. For example, calculating a single price for an option can take several hundred microseconds to a few milliseconds and each underlying security may correspond to several hundred options. In addition, information in the look-up table can be structured to enable automated decisions to be made for select traded items sooner than for other traded items. To further enhance the response speed of the trader, the trader's computer equipment may be dedicated or substantially dedicated to performing automated trading operations, with limited or minimized overhead permitted for other tasks. Further, the trader's computer equipment assigned to automated trading may be used to process raw trading information received from the exchange. The present invention is further capable of reducing the time delay associated with the transfer of trading information from the exchange computers to the trader.

In an additional aspect of the present invention, safe and accurate automated trading may be achieved by performing various checks of the information used in decision-making and/or information concerning the order. Further, an automated hedging feature may be invoked which, when a trader takes a position in a security, automatically establishes a hedge position in a related security.

Reference will now be made in detail to the present exemplary embodiment(s) of the invention illustrated in the accompanying drawings. Wherever possible, the same reference numbers will be used throughout the drawings to refer to the same or like parts.

Figure 1:
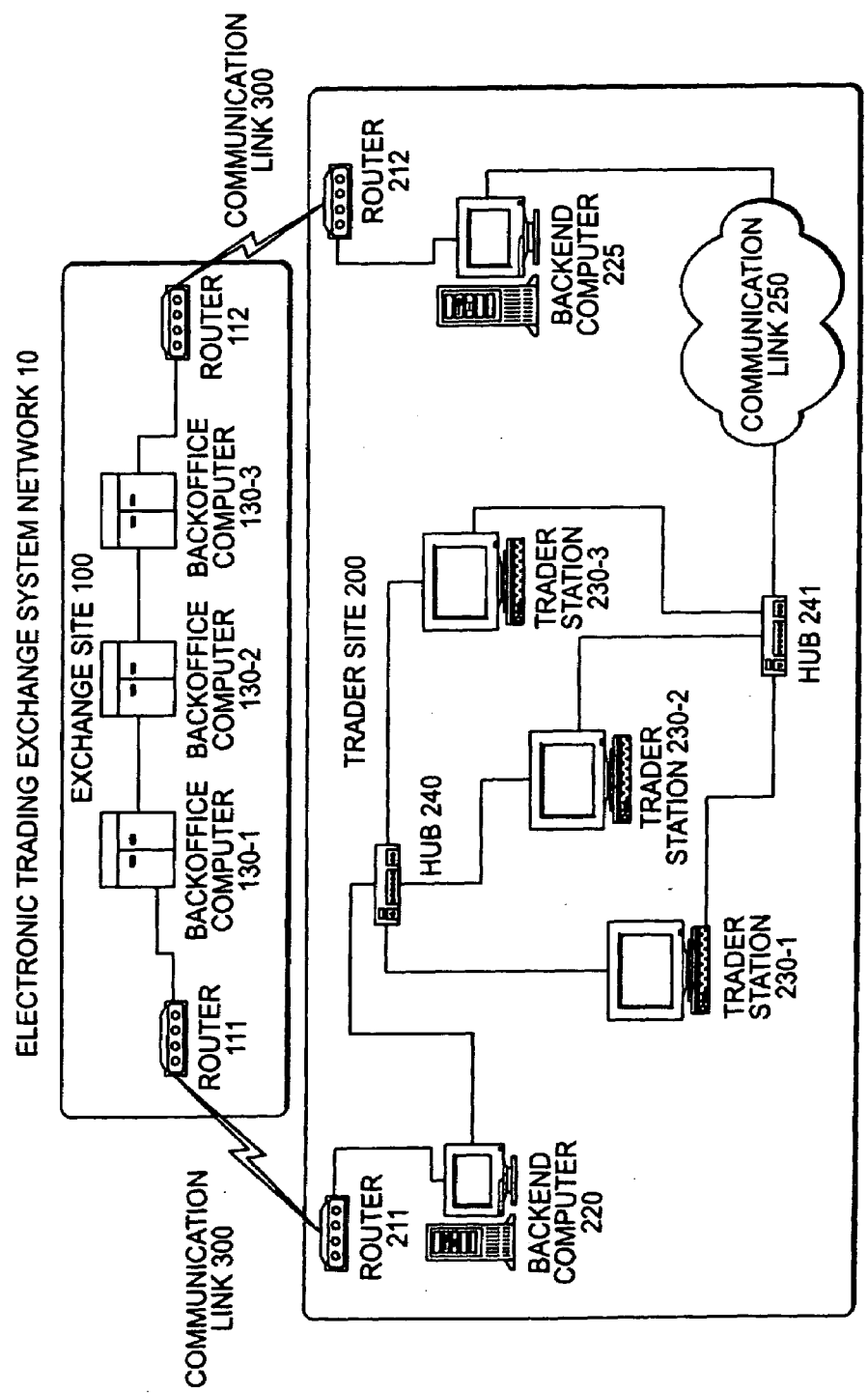
FIG. 1 illustrates an embodiment of an electronic trading exchange system network in accordance with the present invention.

FIG. 1 provides a schematic of an embodiment of an electronic trading exchange system network 10 that may be used in connection with the present invention. Other network arrangements may be used as well. The electronic trading exchange system network 10 includes an exchange site 100 and a plurality of trading sites 200. For purposes of simplification, FIG. 1 illustrates an exchange site 100 linked to a single trading site 200. Other trading sites 200 may be located in a different part of the same city, as the exchange site 100, a different city, a different country or different continent as the exchange site 100. The exchange site 100 need not be limited to equipment provided at a single location, but may be provided in multiple locations linked by a network. Similarly, the trading sites 200 need not be limited to equipment provided at a single location, but may include equipment at multiple locations linked by a network, such as a wide area network (WAN).

The exchange site 100 may be linked to the trading site 200 by one or more communication links 300. The communication links 300 may be part of a wide area network formed by dedicated communications lines, commonly-accessible communication lines, or a combination thereof. For example, dedicated lines may be strung between the exchange site 100 and one or more of the member trading sites 200. Alternatively, dedicated lines may be leased from telephone, cable, or other communication network operators. For example, the public switched telephone network may embody the commonly-accessible communication lines. Of course, the communications links 300 may also include, in whole or in part, wireless communications, such as microwave or satellite links.

In one embodiment, the exchange site 100 may be designed as a local area network (LAN) and include, for example, one or more security routers and one or more back office computers, among other equipment. For purposes of illustration only, two security routers 111, 112 and three back office computers 130-1 130-2, 130-3 (referred to collectively as back office computer 130) are shown in FIG. 1. The security routers 111, 112 control communications between the back office computers 130 and the communications links 300. Each security router 111, 112 transmits and receives communications over the communications links 300, as well as restricts communications from unauthorized sources.

More particularly, the security router 111, 112 may be used to isolate the equipment at the exchange site 100 from intrusion and facilitate communication with the back office computers 130. The back office computers 130 manage the trading of the various securities (e.g., futures, options, swaps or other derivatives; currencies, stocks, bonds, or other physicals like corn, precious metals, electricity, etc.) and/or other items traded on the exchange. For example, one or more of the back office computers 130 may function as market servers. In this capacity, they may maintain order books, perform order matching, generate market information for use at the exchange site 100 and/or for transmission over the communication links 300, and supply trade information to other back office computers 130 for accounting and/or cash settlement purposes. One or more of the back office computers 130 may function as short-term accounting servers. As such, these computers may receive information from the market servers and generate information for transmission over the communication links 300. The short-term accounting servers may be initialized with status information from the previous day's trading before performing accounting tasks for the current day. One or more of the back office computers 130 may function as long-term account servers and, accordingly, function to collect data from the short-term accounting servers for batch processing and record. The long-term account servers may supply information to initialize the short-term account servers and generate reports for transmission to trading sites 200. Of course, the back office computers 130 may perform additional functions and a single computer may perform more than one of the above functions.

The trading sites 200 may include a LAN architecture having one or more security routers, one or more backend computers, one or more trader stations, and one or more hubs, among other equipment. For purposes of illustration only, FIG. 1 shows two security routers 211, 212, two backend computers 220, 225, three trader stations 230-1, 230-2, 230-3, (collectively referred to as trader stations 230) and two hubs 240, 241. The security routers 211, 212 transfer trading information between the trading site 200 and the exchange site 100 and screen communications from unauthorized sources. The hubs 240, 241 distribute data between the backend computers 220, 225 and the trading stations 230.

Backend computer 220 may be configured as a communication server for the trader stations 230. The exchange often supplies software and/or hardware for the backend computer 220 to facilitate communications with the exchange site 100. Backend computer 220 handles communications between the trader stations 230 and the back office computers 130 of the exchange. Of course, the trader site 200 may include multiple backend computers 220.

Backend computer 225 may also be equipped with software and/or hardware that facilitates communications with the exchange site. Some exchanges, for example, such as the EUREX (the German and Swiss Derivatives Exchange), recommend installation of a redundant on-site backend computer in the event that the primary communication backend computer 220 fails. In addition, backend computer 225 may be configured to perform automated trading functions under the control of one or more of the trader stations 230. The automated trading functions are described in more detail below. The backend computer 225 should be equipped with a high-speed processor and sufficient memory to efficiently handle automated trade processing. The trader stations 230 may control backend computer 225 remotely through a communication link 250, for example, a WAN. The trader site 200 may include multiple backend computers 225.

In one preferred embodiment, backend computer 225 is dedicated or substantially dedicated to performing automated trading-related functions, as discussed in greater detail below. Backend computer 220, rather than backend computer 225, may be assigned trading-related tasks, such as (1) serving as a gateway to communicate market information from the exchange site 100 to trader stations 230, (2) submitting, deleting, and modifying orders and quotes to exchange site 100 from the trader stations 230, (3) receiving real-time trade confirmations and end-of-day back office reports, and/or (4) performing risk analysis, position management, and accounting functions. In this way, backend computer 225 may perform automated trading functions with limited interruption or delays associated with other tasks the backend computers (such as backend computer 220) may be requested to perform. This increases the response speed for automated trading operations. Moreover, the total time delay in submitting an order to the exchange site 100 includes a component attributable the transmission delay or network lag in transmitting signals between the exchange site 100 and the trader site 200. Therefore, backend computer 225 is preferably located near to the equipment of the exchange site 100 to reduce delays associated with transmitting information and orders between the backend computer 225 and the exchange site 100. Accordingly, the total time for responding to trading opportunities can be reduced both by reducing transmission delays and by increasing decision-making speed at the trader site 200. Significantly, the backend computer 225 may be remotely supported or controlled by a distant trader station 230, which permits the trader station 230 to be located virtually anywhere without adversely affecting the response time of the automated trading system. Accordingly, the trader site 230 may be chosen based on considerations such as tax, real estate costs, and quality of life, without having to worry that trader station location will impair the performance of automated trading carried on by backend computer 225.

Trader stations 230 receive information from the exchange site 100, process that information, and display at least part of it on a monitor. Each trader station 230 typically runs interactive software that enables a trader, among other things, to submit orders and/or quotes to the exchange site 100. As discussed further below, one or more of the trader stations 230 may additionally be equipped with software for controlling the automated trading functions of backend computer 225.

Figure 2:
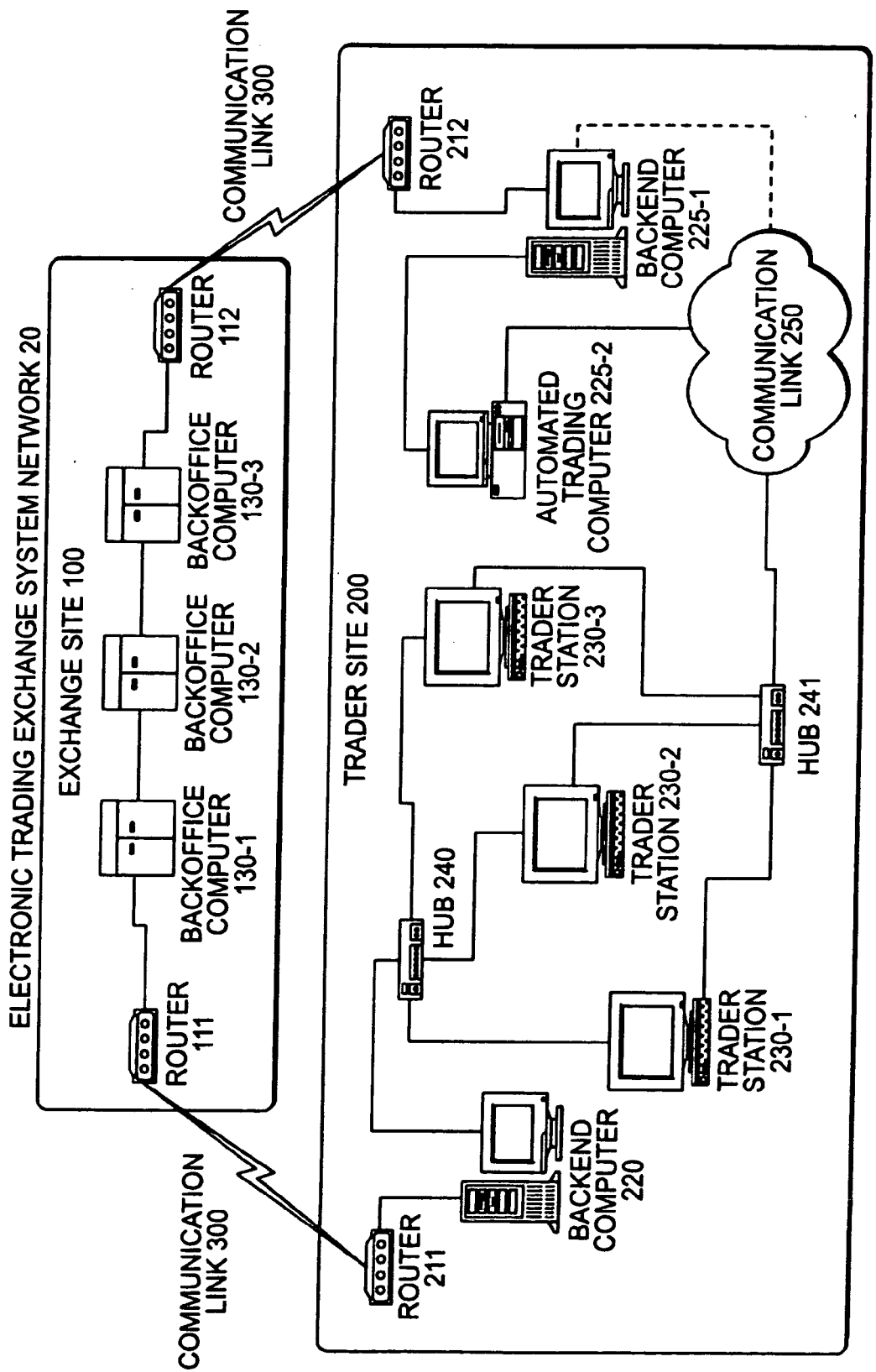
FIG. 2 illustrates a further embodiment of an electronic trading system network in accordance with the present invention.

FIG. 2 illustrates an alternative embodiment of an electronic trading exchange system network 20. For the sake of brevity, features of FIG. 2 similar to those in FIG. 1, which are described above, will not be repeated. In FIG. 2, the trading site 200 includes an automated trading system computer 225-2 separate from the backend computer 225-1. In this embodiment, the automated trading system computer 225-2 performs automated trading system functions and the backend computer 225-1 manages communications between the automated trading system computer 225-2 and the exchange site 100. The automated trading system computer 225-2 may be connected to the backend computer 225-1 using, for example, network interface cards or through a hub (not shown). The automated trading system computer 225-2 may be controlled using one or more trader stations 230 either locally or through a communication link 250. Alternatively, the automated trading system computer 225-2 may be controlled through the communication computer 225-1 (as indicated by the dotted lines), which would serve to communicate information between the trader stations 230 and the automated trading system computer 225-2.

Figure 3:
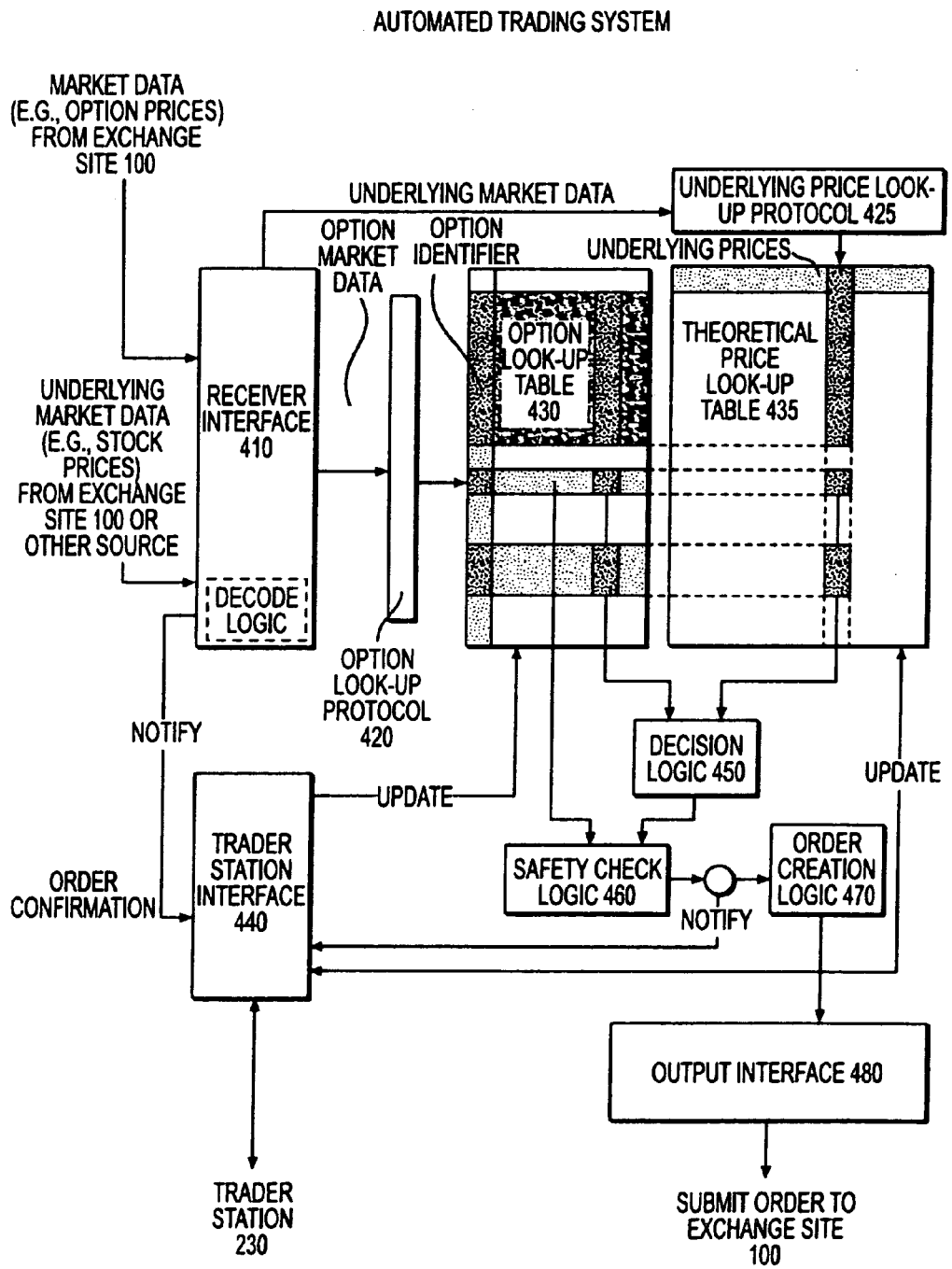
FIG. 3 provides a schematic of the functionality of an embodiment of an automated trading system in accordance with the present invention.

FIG. 3 provides a functional diagram illustrating the operation of an embodiment of an automated trading system used in connection with options trading. Of course, the embodiment may be modified for use in trading other securities (e.g., futures, options, swaps or other derivatives; currencies, stocks, bonds, or other physicals like corn, precious metals, electricity, etc.) and/or other items traded on the exchange. The automated trading system is preferably resident in the backend computer 225 as configured in FIG. 1, which may utilize multiple CPUs. However, it may also be resident in one or more of the trader stations 230 or the backend computers 220. The automated trading system software may run in a text-based environment or a Windows or Windows-like environment. For example, the automated trading system may be run on an operating system, such as VMS, DOS, or LINUX, or in a WINDOWS or similar operating system, which is more user-friendly. In some operating systems, automated trading may be assigned priority over other tasks or processes and run without debug messages. Local decision-making times of less than 250 microseconds have been achieved in a text-based VMS system run on a backend computer 225 and times of 50-150 milliseconds or less have been achieved on a Windows-based system run on a trader station 230, depending on the processor load from other tasks.

The automated trading system receives and decodes current market information broadcast from the exchange site 100 through a receiver interface 410. The decoding of market information may be performed, for example, transparently by software supplied by the exchange for use with the backend computers, by the exchange software at the request or direction of the automated trading system, or by the automated trading system itself. The current market information may include information related to the options and underlying security of the option. Specifically, market bid, ask and last prices and the day's volume for call options (the right to buy the underlying security at a specified time in the future at a specified price), put options (the right to sell the underlying security at a specified time in the future at a specified price) and the underlying security, to name a few, are typically received by the trader site. An option look-up protocol 420 is used to locate the particular option identified in the current market information in an option look-up array or table 430, which may be formed in memory of the backend computer 225. The look-up protocol 420 may be any of several known look-up or search protocols. For example, the look-up protocol may involve a linear search, search tree, use of a hash or index table, or other known search protocol.

The option look-up array or table 430 stores information concerning options that may be automatically traded. For simplicity, a two-dimensional table having rows and columns will be described. However, it should be understood that higher-dimension arrays or tables may be used in connection with the present invention. Each row of the option look-up table 430 stores information relevant to a particular option including, for example, option name, current market prices, times and quantities of the most recent trades by the trader, maximum 430 order quantity, and whether automated trading is enabled for the option. As discussed further below, this information may be used as a check against erroneous operation. Alternatively, option look-up table 430 may store information in connection with items that are actually being automatically traded at a given time. As a further alternative, look-up table 430 may include indices that link only the items currently enabled for automated trading and skip those for which automated trading is not enabled. In such a case, an additional table may be maintained for the full set of items for which automated trading may be performed. This is useful in increasing the speed at which a disabled option can be enabled. Accuracy checks may use both the additional table and look-up table 430. Communications between the automated trading system and the trader stations 230 are conducted through a trading station interface 440. For example, a trader station 230 may update information contained in the option look-up table 430 via a trading station interface 440. In this way, the option look-up table 430 may be updated to enable (disable) automated trading for a particular option.

The option look-up table 430 may be organized in several different ways. For example, the market bid and ask prices for a particular option may be stored in different rows of the option look-up table 430. Alternatively, the bid and ask prices may be stored in the same row of the option look-up table 430, but in different columns, or as different cells in a price dimension, for example. Also, the option look-up table 430 may be segmented, for example, so that all bid prices are grouped together and all ask prices are grouped together. Different classes of options (i.e., options with different underlying securities) may be indexed in a single look-up table 430 or in multiple look-up tables 430, for example, with each option having its own look-up table 430.

In addition to the current market information concerning option trading, the automated trading system may receive and decode current market information concerning the security (or securities) underlying the options. For example, an exchange that trades the underlying security typically maintains a book of bid (ask) prices and quantities of current order and quotes of those traders wishing to buy (sell) the underlying security. The automated trading system may receive the underlying market information, for example, from the exchange site 100, from a separate exchange site, or from another market feed either directly or indirectly, e.g., through a trader station 230. The underlying market information for a given security may be indexed in a theoretical price look-up array or table 435, which may be formed in the memory of backend computer 225, to identify theoretical buy and sell prices for options associated with the underlying security. While the theoretical price look-up table 435 may constitute a multi-dimensional array or table, a two-dimensional table will be described for purposes of simplicity. It should be understood that data structures other than arrays or tables may be used in connection with the present invention. The theoretical price look-up table 435 may be updated by a trading station 230 via trading station interface 440. In one embodiment, the trader station 230 supplies the content of the theoretical price look-up table 435 to the automated trading system.

The theoretical buy and sell prices for derivatives, such as options, may be determined using mathematical models. The mathematical models produce a theoretical value for an option given values for a set of variables that may change over time. Variables considered in these models may include (1) the current market price of the underlying security (e.g., the price of the stock or future from which the option is derived), (2) risk free interest rates, (3) volatility of underlying price, (4) dividend stream, (5) time until expiration, (6) whether the option can be exercised before the expiration date, and (7) whether the option is a call or put. Variables (2)-(7) are not likely to change as frequently as the price of the underlying security, variable (1). Some variables, such as price of the underlying security, can be derived from the market. Other variables require some qualitative assessment by the trader. In one embodiment of the invention, the current market price of the underlying security is used to index the theoretical price look-up table 435. However, the theoretical price look-up table 435 may be indexed using other variables in addition to or instead of current market price of the underlying security.

The current market price of the underlying security may be defined in several different ways. At any given time during normal trading, the underlying security will usually have: (1) bid prices and quantities; (2) ask prices and quantities; (3) a last price and volume at which the underlying security was traded (last price); (4) an average of the current highest bid and lowest offer prices (average best bid, best ask price); and (5) an average price of a certain depth, among other values. The average price of a certain depth, say 5000 shares, would take the average of the: (a) best (highest) bid prices in the book of the first 5000 shares, and (b) best (lowest) offer prices in the book of the first 5000 shares. Obviously, there are many more definitions of underlying price that can be created, for example, using permutations of the five definitions provided above.

It is highly probable that at least four of these five definitions will yield (perhaps slightly) different results at any time. Since the normal hedging response of an option trade is to buy or sell the underlying security, the option trader may very carefully define underlying price used in her models. Specifically, buying (selling) calls and selling (buying) puts will usually lead to selling (buying) the underlying for hedging. For reasons discussed further below, the trader may want to set the theoretical buy price for call options and the theoretical sell price for put options using the bid price (and/or possibly bid underlying depth) of the underlying security. Likewise, the trader may want to set the theoretical sell price for call options and the theoretical buy price of put options using the ask price (and/or possibly the ask underlying depth) of the underlying security. In summary, theoretical value calculations used for automatic option trading should be flexible enough to use various definitions of underlying price.

In addition to generating a theoretical value for an option, the trader selects a buy spread and a sell spread. The buy spread may be subtracted from the theoretical value to produce the theoretical buy price—the highest price at which the trader is willing to buy a particular option using automated trading. The sell spread may be added to the theoretical value to produce the theoretical sell price—the lowest price at which the trader is willing to sell a particular option using automated trading. Accordingly, the trader would like to sell an option having a bid price that is the same as, or higher than, the trader's theoretical sell price. The trader would like to buy the option from anyone offering a price that is the same as, or lower than, the trader's theoretical buy price.

Accordingly, in the embodiment illustrated in FIG. 3, the theoretical price look-up table 435 is designed to correlate the current market price of an underlying security to the theoretical buy and sell prices of the options for which automated trading is performed. For example, if automated trading is performed for options underlying Exxon stock, the theoretical price look-up table correlates the current price of Exxon stock to the theoretical buy and sell prices of Exxon stock options. If the price of Exxon stock changes, the theoretical price look-up table can be used to index different theoretical prices for the Exxon stock options.

Similar to the option look-up table 430, the theoretical price look-up table 435 may be organized in several ways. For example, all theoretical buy prices for a given price (such as bid price or ask price) of an underlying security may be provided in a single column of a look-up table 435, with a separate look-up table provided for theoretical sell prices. Alternatively, the look-up table 435 may index both a theoretical buy price and a theoretical sell price. The theoretical price look-up table 435 may be segmented or multi-dimensional. Moreover, the theoretical price look-up table 435 may be combined with, a portion of, or linked to option look-up table 430.

In addition, the theoretical look-up table 435 and the option look-up table 430 can be structured consistent with the particular search protocol used by the option look-up protocol 420 so that certain options or other items are located by the search protocol before other options or items. For example, if option look-up protocol 420 implements a linear search, the first options in the option look-up table 430 and the theoretical look-up table 435 (e.g., at the top of the tables 430 and 435) will be reviewed by the option look-up protocol 420 before options at the bottom of the table. Accordingly, the trader station 230 or the backend computer 225 may structure the option look-up table 430 and/or the theoretical price look-up table 435 so that options that have shown in the past, or are likely to show in the future, the most promising profits will be located first. The particular order of the options in the tables 430 and 435 may depend on the trading volume in an option, for example. Options with relatively high traded volumes over recent trading days or the current trading day may be given a higher priority ranking in look-up table 430 and/or theoretical price look-up table 435. Moreover, some exchanges may limit the number of orders that a particular trader may submit at a given time. Accordingly, structuring the tables 430 and 435 as described increases the opportunity for the trader to participate in the most lucrative transactions when there are restrictions on the number of concurrent orders placed.

In accordance with the embodiment shown in FIG. 3, the trader station 230 may respond to changes in variables (2)-(7) and/or other variables taken into account in determining theoretical buy and sell prices by updating the theoretical price look-up table 435. Alternatively, the theoretical price look-up table 435 may hold theoretical prices over ranges of any one or more of the items defined by theoretical price variables (1)-(7) described above, as well as other variables that one may wish to take into account, such as variable buy and sell spreads (described in more detail below). In such a case, theoretical price is identified in an n-dimensional look-up table 435 responsive to n variables.

Calculating the theoretical value for options or other trading derivatives can be relatively time consuming. Moreover, the theoretical values for a series of options change when one of the contributing variables changes. As noted above, some of these variables, such as price of the underlying security, may change frequently. Use of the theoretical price look-up table 435 avoids the need for recalculating theoretical prices when the value of a variable that affects the theoretical price changes. Calculating the theoretical price each time a variable changes unnecessarily consumes computer resources, such as CPU time, better allocated to performing automated trading. The automated trading system of the present invention utilizes a precalculated table of theoretical prices over a range of one or more variables that affect theoretical price. Accordingly, when a variable affecting theoretical price (such as the market price of the underlying security) changes, the automated trading system simply references a new theoretical price in the theoretical price look-up table 435 and uses the new theoretical price in deciding whether to buy or sell options.

The values stored in the theoretical price look-up table 435 may be calculated, for example, using one or more of the trader stations 230, a backend computer 220, the backend computer 225, or some combination of these. When a trader station 230 calculates the values for the theoretical price look-up table 435, the backend computer 225 may be free to focus its computing resources on automated trading. However, the additional overhead associated with using the backend computer 225 to calculate the values for the theoretical price look-up table 435 may be acceptable in some applications.

Referring still to FIG. 3, decision logic 450 compares the theoretical price identified in the theoretical price look-up table 435 to the market price for the option, and based on the comparison, determines whether the option should be bought or sold. For example, in an embodiment in which the theoretical look-up table 435 indexes theoretical buy and sell prices for a particular option based on the price of the underlying security, decisions may be triggered (1) when the market price of the underlying security changes, but the market bid and ask prices of the option remain the same (i.e., changing underlying price, static option price), (2) when the bid or ask price of the option changes, but the market price for the underlying security remains the same (i.e., changing option prices, static underlying price), (3) when the values of theoretical price table 435 are updated, (4) when automated trading is enabled for a particular option, and (5) when safety checks are relaxed for a particular option.

Consider example (1) in which the theoretical buy (sell) price of a particular option changes (for example, as a result of a change in underlying security price) and the bid and ask prices of an option remain static. Decision logic 450 will compare the current market ask (bid) price of the option to the new theoretical buy (sell) price obtained from the theoretical price table 435. In this case, the decision logic 450 performs all comparisons affected by the change in underlying price. For example, a change in the bid (ask) price of the underlying security may affect the theoretical buy (sell) price of some or all call options and the theoretical sell (buy) price of some or all put options associated with the underlying security. Accordingly, the decision logic 450 makes comparisons of market bid or ask prices corresponding to new theoretical sell and buy prices.

Consider example (2) in which the market bid (ask) price for a particular option changes and the price of the underlying security remains static. The decision logic 450 will compare the new market bid (ask) price to the corresponding theoretical sell (buy) price that exists at that time from the theoretical price table 435. Accordingly, a change in market bid (ask) price of a particular option may trigger a comparison of market bid (ask) price to theoretical sell (buy) price. Based on the comparison, for example, if the market bid (ask) price is greater (less) than or equal to the theoretical sell (buy) price, the automated trading system may prepare an order for the particular option.

Consider example (3) in which the theoretical price look-up table 435 is updated with static market option and underlying prices. For example, when the look-up table 435 is updated, the decision logic 450 compares the updated theoretical buy and sell prices corresponding to the current market price of the underlying security to the current ask and bid prices of the options subject to automated trading. As noted above, the theoretical price look-up table 435 may be updated when, for example, one or more of the values that effect the theoretical buy and sell prices changes such as, but not limited to, the buy and ask spreads and/or theoretical variables (2)-(7). For example, theoretical price variables (2)-(7) discussed above could change, perhaps due to a change in the trader's assessment of market conditions. These changes may occur when the trader enters new information through a trader station 230 or when new information becomes available through another source (e.g., a change in risk-free interest rate occurs in a database associated with the trading site 200). A change in one or more of variables (2)-(7) triggers a re-computation of (probably) all values in the theoretical look-up table 435. These new values in table 435 are updated on backend computer 225. Accordingly, the decision logic 450 makes comparisons of market bid and ask prices corresponding to new theoretical sell and buy prices.

Consider example (4) when automated buying or selling trading for a particular option is changed from disabled to an enabled state. This could arise, for instance, at the beginning of the trading day if the default state of a new trading session is all options disabled. Enabling automated selling (buying) for a particular option or group of options can trigger decision logic 450 to make a comparison of the market bid (ask) prices to the theoretical sell (buy) price in table 435.

In addition to enabled and disabled states, a third, "warming up" or "test" state may be provided for an option in the automated trading system. In this third state, the automated trading system may perform all steps except actually placing an order. This allows the trader to monitor the operation of the automated trading system without actually submitting orders, thereby reducing the risk of enabling options for automatic trading using theoretical prices which are not market realistic.

Consider example (5) in which a safety check for a particular option is relaxed. This could arise, for example, if a global safety check condition implemented by safety check logic 460 is disabled or changed. For example, a safety check condition relating to the maximum quantity or frequency of trading attempts of a particular option may be increased. In connection with the trading frequency condition, the entire automated trading system may be held in a "pause" state if it had made more than a predetermined number (e.g., 3) automated trading attempts within a predetermined time period (e.g., 60 seconds). If this global safety check is disabled or relaxed, for example, by increasing the predetermined number of attempts (e.g., from 3 to 5), the trading frequency safety check may no longer be in violation. As a result, the entire automated trading system may transition from the "paused" state to the enabled state. If a particular option had been enabled for automated selling (buying), the decision logic 450 will then compare the market bid (ask) price to the theoretical sell (buy) price in table 435.

Decision logic 450 determines that a sell (buy) order should be submitted if the market bid (ask) price is greater (less) than or equal to the theoretical sell (buy) price. Even if decision logic 450 determines that an order should be submitted, safety check logic 460 may be used to prevent an order from being submitted. Safety check logic 460, for example, can block orders entirely, or put a cap on the maximum quantity attempted to be bought or sold, for an option when acceptance of that order would result in the trader having a position greater than a predetermined threshold quantity of that option. Also, the automated trading system may be paused or stopped if the number of attempted orders exceeds a predetermined amount in a predetermined period of time. The constraints may be provided in look-up tables provided to the automated trading system and may be varied for individual options. Other constraints may involve generating warnings and/or preventing orders, for example, when the: (1) theoretical buy price exceeds the theoretical ask price, (2) theoretical buy price exceeds the theoretical value, (3) theoretical sell price is less than the theoretical value, and/or (4) theoretical sell price is less than the intrinsic value of the option. The intrinsic value may be defined as the difference between the strike price and the market price of the underlying security for puts, and the difference between the market price of the underlying security and the strike price for calls, where the minimum intrinsic value is zero. The trader may be able to override some or all of the checks performed by safety check logic 460 to increase speed of automated trading.

If the safety checks are passed (or overridden), order logic 470 creates an order and submits the order to the exchange site 100 via an output interface 480. The trading station 230 is notified through a trading station interface whether or not the safety checks are passed. The output interface 480 may pass the order to exchange interface software for ultimate transmission to the exchange site 100. The receiver interface 410 and the output interface 480 may be formed by common equipment and/or data ports.

FIG. 4 illustrates an example of theoretical price look-up table 435 for call options with an expiration date of Sep. 20, 1999; an annualized volatility of 32.0%; expected dividend to be paid on the underlying security on Aug. 19, 1999, for an amount of $10.0; risk free interest rate of 3.0%; American style option; and today's date being Jun. 3, 1999. When created, the look-up table 435 may be centered about the current price of the underlying security. Each row of the look-up table 435 provides theoretical prices for a given strike price. As illustrated, the look-up table 435 includes twenty (20) rows having strike values ranging from 50.0 to 97.5, in increments of 2.5. The strike values correspond to individual options available for trading as determined by the exchange. The trader may limit the set of options to those he/she actually trades, and consequently can enable them for automatic trading, individually or in predefined groups. The columns of the look-up table 435 provide theoretical prices for a given price of the underlying security. The range of underlying security price provided in the table and the incremental price between adjacent entries (tick size) can be selected by the trader. For example, the look-up table 435 shown in FIG. 4 has twenty-nine (29) price entries ranging from 75.0 to 77.8 with tick size is 0.1 and with the underlying price centered at 76.4. A smaller tick size and a larger range will, of course, result in a larger look-up table. Under the assumptions of FIG. 4, a September 1999 call, with a strike price of 72.5 and an underlying price of 77.2 (using a definition of underlying price determined by the trader), has a theoretical price of 7.30.

Several alternatives are available for updating the look-up table 435 to avoid the underlying price from exceeding the boundaries of the table. For example, the automated trading system may notify the trader station 230, which may then in turn supply an updated look-up table 435 centered about a new underlying price. The trader station 230 may be called upon to calculate the additional entries needed to complete the updated look-up table 435 or simply recall them from memory. For example, the look-up 435 table may be updated dynamically from the trader station 230 when the underlying price moves from the center price by a predetermined margin. This methodology serves to increase the processing power that the backend computer 225 can apply to automated decision making.

The look-up table 435 can be checked periodically to ensure the accuracy of its content. For example, checks may be performed every, say, 15 seconds. This can be done, for example, by performing a checksum operation in which the entries in the look-up table are summed and the sum is compared with the sum of a corresponding look-up table maintained by a trader station 230. If the sums match, the look-up table 435 may be presumed to be accurate. If the sums do not match, a warning is generated and automated trading is stopped completely or paused until look-up table 435 is reloaded or updated and accuracy can be ensured. Of course, other or additional techniques for testing the accuracy of look-up table 435 may be implemented. Moreover, such an accuracy check may be omitted if one is sufficiently confident in the reliability of the software and hardware.

Knowledge of how the search protocol locates data within the look-up tables may be used to structure the look-up tables to ensure that selected options will be located particularly quickly. The selected options may be, for example, frequently traded options and/or options whose price will become attractive with a small change in the underlying security price. For example, the look-up protocol may conduct searches by starting at the first row of the table and then stepping through each successive row until a particular row is identified. In this case, the look-up table may be structured so that a select option is placed in the first row. Consequently, the search protocol will locate the select option first. Statistics may be maintained, for example, at a trader station 230, and used to restructure the look-up table as trading conditions change.

The embodiment described in connection with FIG. 3 compares the current market price of an option to theoretical buy and sell prices from a theoretical option price look-up table 435 to make a buy/sell decision. However, other values may be compared consistent with the present invention to generate buy/sell decisions. For example, the theoretical option value may be subtracted from the market bid (ask) price and compared to a sell (buy) spread selected by the trader to generate buy/sell decisions. Alternatively, the market option bid (ask) price and the price of the underlying security may be used to index an implied volatility value, for example, with that indexed implied volatility value compared to a trader-generated volatility value to make buy/sell decisions. Of course, other values may also be indexed and used for comparison to generate buy/sell decisions consistent with the present invention.

Figure 5:
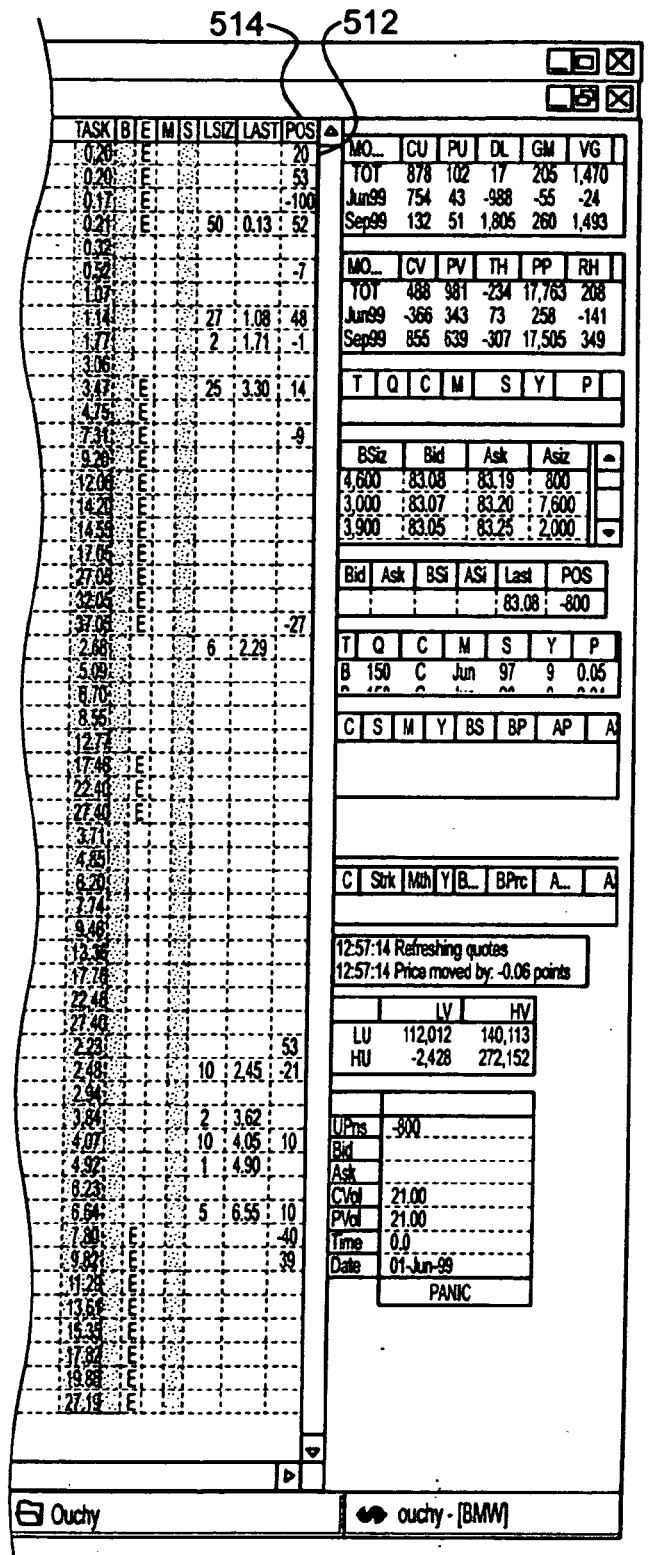
FIG. 5 illustrates an embodiment of a trading screen for use in connection with a trader station in accordance with the present invention.

FIG. 5 illustrates an embodiment of a trader screen 500 displayed on a trader station 230 in connection with trading options on a particular security or commodity. The trading screen 500 may provide a graphic user interface to enable the trader to set parameters associated with automated trading. Trading screen 500 is organized as an array of cells 510. The rows 512 of the array represent different options available in the market for the particular security or commodity. The columns 514 of the array provide information concerning the options. More particularly, the columns to the left of the "Strike" column provide information on call options and the columns to the right of the "Mon" column provide information on put options. Call and put options are, thus, displayed as mirror images of each other.

Each row of the array represents information relating to a different pair of call and put options for a particular strike price, month and year. The first column from left to right is labeled "DCX," which identifies the underlying security for the options as Daimler-Chrysler stock. The values below the "DCX" label consecutively number the rows of the array. The trading screen may be scrolled up or down to view additional rows in the array, if any exist. The next fourteen columns contain information relating to call options. The second column, "POS," is to the right of the "DCX" column.

The values below the column heading POS indicate the trader's position (i.e., how many of the options the trader possesses) in call options for each row of the array. A negative cell value in the "POS" column indicates that the trader has sold more of the option than she has bought (this is called a short position. Positive values denote a long position). Cells in the "B" column (three columns to the right of the "POS" column) indicate whether automated buying is enabled for the particular options corresponding to those cells. Cells in the "S" column (three columns to the right of the "B" column) indicate whether automated selling is enabled for the particular options corresponding to those cells. The trader may select one or more sells in the "B" and "S" columns to enable or disable automated buying and selling, respectively, of options corresponding to the selected cells.

The "TBid" and "TAsk" columns indicate the theoretical buy and sell prices for automated trading. The "Theo" column represents the theoretical value assigned to the call option for each row. To the right of the "Mon" column, the screen provides "TBid," "TAsk," "Theo," and "POS" columns, among others, for the put options in each row of the array. Additional details concerning the remaining columns of the trader screen 500, as well as other information concerning its functionality, can be found in U.S. application Ser. No. 09/273,362 to Marynowski et al., filed Mar. 22, 1999, and expressly incorporated herein by reference.

The "POS" columns provide information received from the exchange site and are not adjustable by the trader. The "TBid," "TAsk," and "Theo" columns may be adjusted by the trader using a mouse, keyboard, or other input device, such as a game pad. For example, the trader may select a particular "TBid" or "TAsk" cell by clicking once and then using up or down arrows, for instance, to increase (arrow up) or decrease (arrow down) the value. Mathematically, this may be achieved by increasing or decreasing the bid spread value (BSprd) or the ask spread value (ASprd). This may not effect the "Theo" value since BSprd and ASprd are not inputs into the "Theo" calculation. A particular "Theo" cell may be adjusted in the same manner as a "TBid" or "TAsk" cell. Mathematically, adjustments to a Theo cell may be achieved by increasing or decreasing the assumed volatility of that particular option. Since "TBid" and "TAsk" of a particular option are related to the "Theo" value, changes to the "Theo" obviously will change "TBid" and "TAsk." The "TBid", "TAsk", and "Theo" values may also adjustable in groups, for example, by selecting multiple cells or all cells in the column by selecting the column header. The trader station 230 may update the displayed values of Theo, TBid and TAsk values as the underlying security price change, or any variable contributing to Theo, TBid, or TAsk change (such as theoretical variables (2)-(7) discussed above). For example, the trader station 230 may receive a market feed providing price information concerning the underlying security. The price information may be used to update or refresh the trading screen 500. This may include the displayed TBid, TAsk, and Theo values for a given underlying price. Additionally, market information received by 230 may trigger an update of the theoretical price look-up table 435 maintained at the backend computer 225. For example, if the underlying price has moved sufficiently far enough from the value of the underlying security used the last time table 435 was created and/or last modified, trading station 230 may update theoretical look-up table 435 using the most current underlying price as a new center point. The updates of the theoretical price look-up table 435 maintained at the backend 225 might be accomplished several different ways. For example, the trader station 230 may perform calculations and supply the calculated information to the backend computer 225 for updating the theoretical price look-up table 435. As an alternative, the trader station 230 may supply data to the backend computer 225, which is used to calculate updates of the theoretical price look-up table 435. Of course, updates of look-up table 435 may not be necessary if the new information (e.g., price information of the underlying security) corresponds to a value: (1) already in the theoretical price look-up table 435, and/or (2) within predetermined margins around the previous center value of the look-up table 435.

Figure 6:
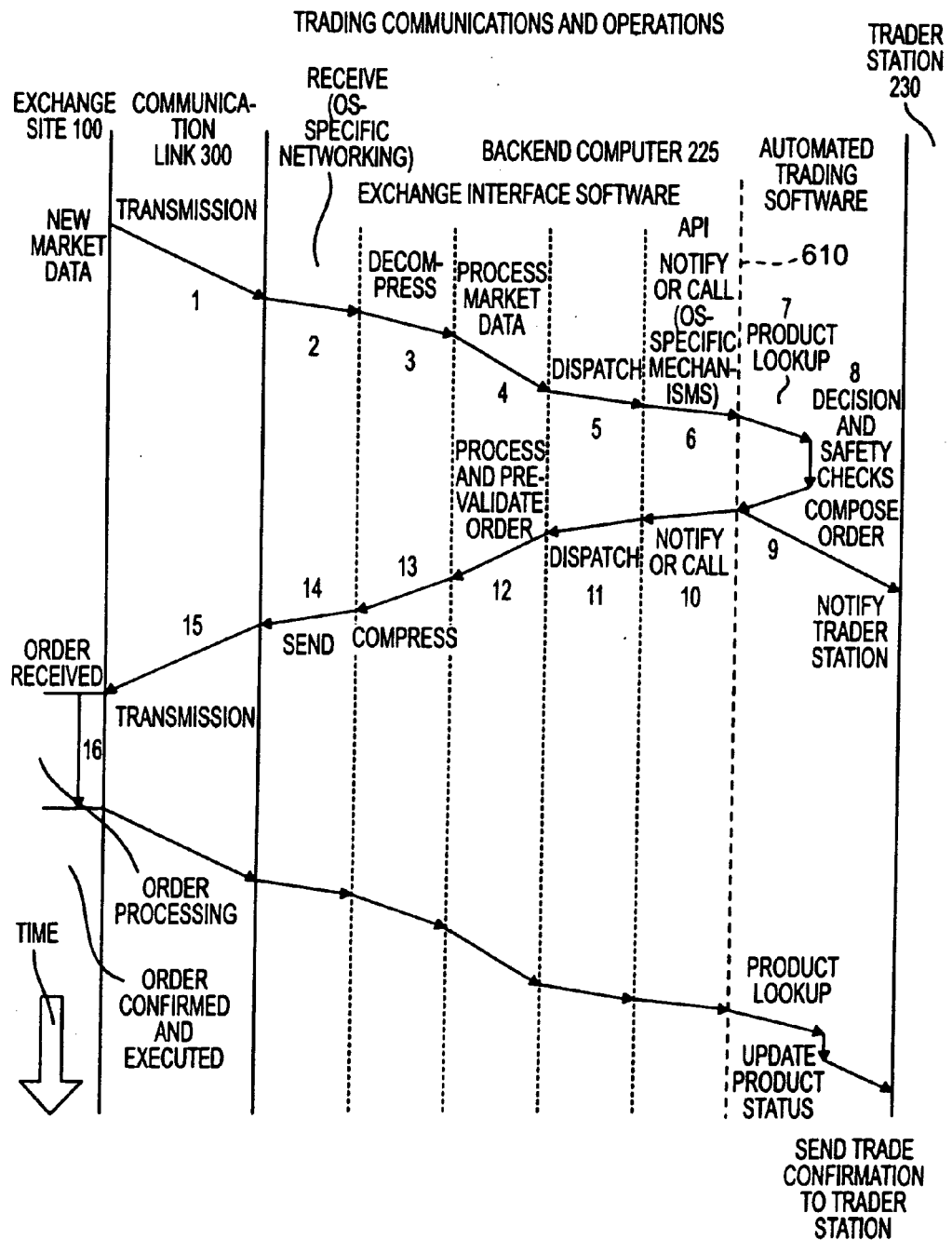
FIG. 6 provides a flow diagram of the steps performed in automated trading in accordance with the present invention.

FIG. 6 provides an exemplary progression of steps from transmission of the current market information from the exchange site 100 to receipt of trade confirmation by the trader site 200 and the delay experienced at each step. Link 1 represents the line delay experienced by current trading information as it is transmitted from the exchange site 100 to the trader site 200. Locating the automated trading system close to the exchange site 100 reduces the line delay of Link 1 (as well as that of Link 15). Thus, by reducing the delay associated with making automated trading decisions as well as the associated line delay, the overall speed in submitting orders to the exchange site 100 is increased. Moreover, the trader station 230 that monitors and controls the backend computer 225 that implements the automated trading need not be located close to the exchange site 100, but may monitor and control the backend computer 225 remotely.

Link 2 represents delays associated with operating system (networking subsystem) related to receiving data packets from the exchange site 100. One technique for reducing this delay is to choose a platform, such as VMS or Linux, that has a good quality implementation of networking services used in automated trading.

Link 3 represents delays associated with decompressing information received from the exchange site 100. Link 4 represents other processing delays that may be inherent in exchange interface software provided by the exchange for use at the trader site 200. The exchange interface software allows the trader's equipment to interface with the exchange equipment. The exchange may impose obligations requiring traders to use the exchange interface software in trading. The exchange interface software, for example, may process the received market data and supply the data to an interface of an automated trading application installed by the trader. For instance, the market data may be input to internal tables and/or may be converted to actual values. Links 5 and 6 represent delays associated with the distribution of information from the exchange interface software to an interface of the trading system application. The exchange site 100 typically broadcasts information concerning all traded items. Each trading application usually subscribes to several sources of data (e.g. market data and trade confirmations for several products). In some cases, the exchange interface software will receive and decode all information received from the exchange site 100, but only pass some of the information to the interface of the automated trading system. The exchange interface software spends some time in determining whether a particular piece of market information should be passed to the automated trading system. The exchange interface software and the trading system interface software communicate via a protocol. For example, the exchange interface software may notify the automated trading system via a callback function supplied by the latter, or by some other operating-system dependent mechanism (e.g., mailboxes on VMS). This delay can be reduced by choosing a platform that efficiently supports the protocol chosen.

After receiving the current market information, the automated trading system decodes the information and, using a look-up protocol, searches a table of traded products, resulting in a delay indicated by link 7. A hash table with an efficient hash key or a search tree may be used to reduce the delay associated with the processing associated with link 7. The particular look-up protocol should be fine-tuned to the platform used for the automated trading system as performance may vary with the platform to the extent that a linear search may prove better than a hash table even for a surprisingly large number of products (over 100). The look-up time for hash tables is almost constant. For binary trees, the look-up time is proportional to the logarithm of N (in O(log N)), where N is the number of products traded. A linear search has a look-up time that is proportional to N (in O(N)). Of course, the actual times encountered in practice matter, so the look-up protocol should be tailored to the platform used Link 8 represents the delay attributable to decision-making and safety checks. As noted above, decisions are made based on a numeric comparison between the current market price and the corresponding theoretical price. Safety checks account for most of the delay experienced in link 8. Safety checks may include, for example: (1) price and quantity reasonability checks, and (2) trade attempt frequency limitations.

Links 9-15 corresponds to the delay associated with composing an order and submitting the order to the exchange. In particular, link 9 reflects the time spent composing the order, which may require a format defined by the exchange. Link 10 corresponds to the time required for the automated trading system output interface to communicate the order to the exchange interface software. This may be done, for example, using a synchronous function call or an asynchronous call. In some embodiments, the tasks associated with links 9 and 10 may be performed at the same time. Links 11 and 12 correspond to the time expended while the exchange interface software receives the order, decides which module should be used to submit the order, interprets the order request, and performs a series of validations. If the order passes these tests, it is converted into the exchange format and passed to the exchange, as indicated by links 13-15.

As noted above, the delays attributable to links 1 and 15 may be reduced by locating the automated trading system close to the exchange site 100. In addition, if routers and LANs are used at the trader site 200, the selection of high-speed equipment may reduce delays and/or priority schemes. The delay experienced in links 2-14 may be reduced, of course, by using a faster computer. However, the efficiency of the software and algorithms is also an important factor in reducing delay. Further, in some situations, it is possible to integrate the automated trading system software with the software that interfaces with the exchange site 100, which leads to reduced delay. In such a case, the automated trading system receiver and output interfaces may be the same as the exchange receiver and output interfaces.

In accordance with the present invention, assuming a change in the bid or ask price, links 6 and 7 may be completed within 80 microseconds, and commonly may be completed within 60 microseconds, and as fast or faster than 31 microseconds. The time from link 6 to the completion of the decision-making by the decision logic may be less than 155 microseconds, less than 120 microseconds, and even less than 80 microseconds. Links 6-8 may be completed within 690 microseconds, may be completed within 370 microseconds, and performed as fast as 260 microseconds or less. Links 6-9 may be completed within 930 microseconds, commonly be completed within 585 microseconds, and as fast or faster than 301 microseconds. Assuming now a change in the price of the underlying security, the time from receipt of the new price information by the automated trading system to submission of an order may be may be the same as or about 20-25 microseconds more than the totals provided in connection with links 6-9 above, depending on the number of options or other items in the data structure (e.g., table) and their respective order. The times required for links 2-5 and 10-14 are generally determined by exchange software and, accordingly, may change from exchange to exchange.

Link 16 reflects the processing of the order at the exchange site 100. Following the exchange site 100 processing, a confirmation of the trade is returned to the trader if the trader's order is matched. Not all orders result in a match. There is no sharing of lucrative trades with other traders who may have submitted similar matching orders that are received by the exchange even some microseconds later.

The embodiment illustrated in FIG. 6 corresponds to an arrangement in which the interface software provided by the exchange and the automated trading system are resident on the backend computer 225. In arrangements in which the interface software and the automated trading system are resident on separate backend computers, the vertical dashed line 610 indicates the interface between the separate computers. The separate backend computers may be connected via network interface cards or a common hub. Additional delays may be experienced in the transmission and reception of between the backend computers as well as from LAN throughput and latency.

Figure 7:
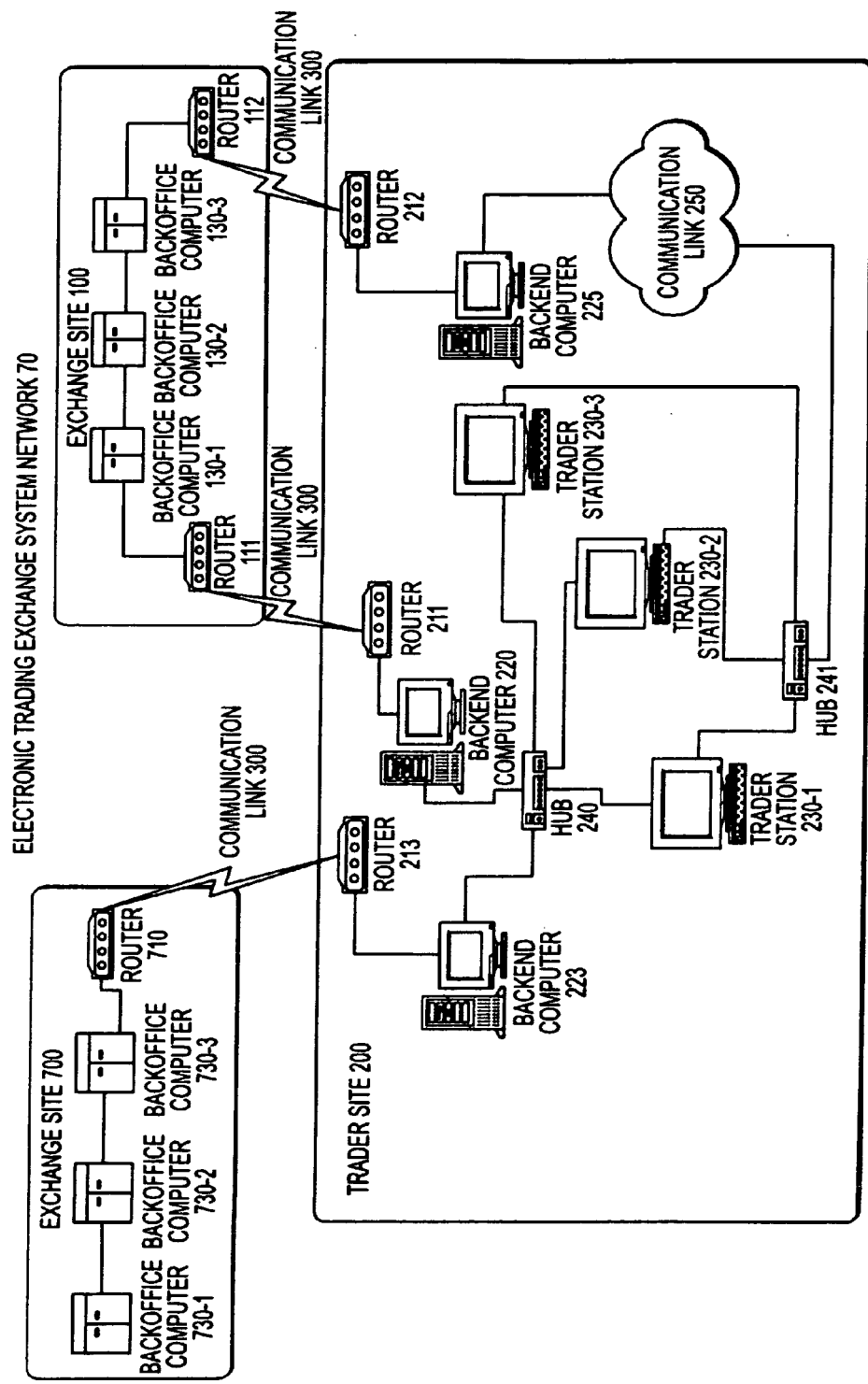
FIG. 7 illustrates a further embodiment of an electronic exchange system network in accordance with the present invention.

FIG. 7 provides a schematic of an embodiment of an electronic trading exchange system network 70 coupled to multiple trading sites. The electronic trading exchange system network 70 is similar to that shown as 10 in FIG. 1 and, for the sake of brevity, duplicative description will be omitted.

As shown in FIG. 7, exchange site 700 is coupled to trader site 200 by communication links 300. In one embodiment, the exchange site 700 may be designed as a local area network (LAN) and include, for example, one or more security routers and one or more back office computers, among other equipment. For purposes of illustration only, a single security router 710 and three back office computers 730-1, 730-2, 730-3 (referred to collectively as back office computers 730) are shown in FIG. 7. Security router 710 controls communications between the back office computers 730 and the communications link 300. Security router 710 transmits and receives communications over the communications link 300, as well as restricts communications from unauthorized sources. More particularly, the security router 710 may be used to isolate the equipment at the exchange site 700 from intrusion and facilitate communication with the back office computers 730. The back office computers 730 manage the trading of the various securities, currencies, commodities and/or other items traded on the exchange. In this regard, back office computers 730 may function similarly to the back office computers 130 of exchange site 100.

For purposes of illustration only, trading site 200 additionally includes a security router 213 and a backend computer 223 coupled to hub 240. The security router 213 and backend computer 223 may be located remotely from other equipment of the trader site 200. Security router 213 transfers trading information between the trading site 200 and the exchange site 700. As above, the security router 213 screens communications from unauthorized sources. Backend computer 223 may be configured as a communication server for the trader stations 230. Hub 240 handles communications between backend computer 223 and trader stations 230.

In the embodiment shown in FIG. 7, trader site 200 is connected to a first exchange site 100 and a second exchange site 700. Of course, other network arrangements may be used in connection with the present invention. Through the first exchange site 100, the trader site 200 may receive market information and trade securities, such as options, futures, and other derivatives; currencies, stocks, bonds, and other physicals like corn, metals, electricity, etc., and/or other items. Through the second exchange site 700, the trader site 200 may receive market information and/or trade securities (e.g., options, futures, and other derivatives; currencies, stocks, bonds, and other physicals like corn, metals, electricity, etc.,) and/or other items. Traders site 200 receives market information and trades securities or other items related to the securities or other items traded through the first exchange site 100.

The trader site 200 may be equipped with an automatic hedging capability that automatically buys or sells securities (e.g., futures, options, swaps or other derivatives; currencies, stocks, bonds, or other physicals like corn, precious metals, electricity, etc.) and/or other items traded on the exchange to hedge at least some of the risk (for example, delta risk) associated with an automated trade for other securities or items. For example, trader site 200 may trade options for a particular stock through exchange site 100 and the particular stock through exchange site 700. In general, two types of orders may be submitted to an exchange to buy (sell) a security. A market order instructs the exchange to buy (sell) a specified quantity of the security at the going market price. A limit order instructs the exchange to buy (sell) up to a specific quantity of the security if the market price is equal or better than a specified value. A trader usually can be assured that a market order will be filled by the exchange, but cannot be certain of the price at which the order is filled. The actual price that the market order is filled depends on available price and depth of market. While the trader placing a limit order can be assured of a price, all or a portion of the limit order may never be filled if the market price never meets the limit order conditions.

The principles of a market order and a limit order are illustrated by the following examples.

| Market Order Price | Market Order Quantity to Sell | Bid Price | Bid Amount | Matched Against Order? |
|---|---|---|---|---|
| Best Available Market Prices | 1000 shares | $110/share | 400 shares | Yes |
| | | $100/share | 600 shares | Yes |
| | | $80/share | 2000 shares | No |

The above table assumes a market with current bids of $110/share for 400 shares, $100/share for 600 shares and $80/share for 2000 shares, as indicated above. A market order to sell 1000 shares will be executed by the exchange at an average price of $104/share. In other words, the 1000 share market order will be matched with 400 shares at $110/share and 600 shares at $100/share, for a net of 1000 shares at an average price of $104/share.

If the bid of $110/share for 400 shares is sold just before the market order is received, the following market is presented.

| Market Order Price | Market Order Quantity to Sell | Bid Price | Bid Amount | Matched Against Order? |
|---|---|---|---|---|
| Best Available Market Prices | 1000 shares | | | Not Available |
| | | $100/share | 600 shares | Yes |
| | | $80/share | 2000 shares | Yes |

Because 400 shares at $110/share is no longer available, the exchange will match the market order using 600 shares of the $100/share bid and 400 shares of the $80/share bid, resulting in an average price of $92/share.

We next consider a similar scenario using limit orders instead of market orders.

| Limit Order Price | Market Order Quantity to Sell | Bid Price | Bid Amount | Matched Against Order? |
|---|---|---|---|---|
| $100/share | 1000 shares | | | Not Available |
| | | $100/share | 600 shares | Yes |
| | | $80/share | 2000 shares | No |

Now assume that a limit order to sell 1000 shares at $100/share is submitted instead of the market order and the $110/share bid has already been matched. The exchange will match 600 shares of the limit order at $100/share and will not match the remaining 400 shares because the $80/share bid is too low. Accordingly, the remaining 400 shares of the limit order will stay in the exchange's book until a new matching order to buy at $100/share or higher is received by the exchange, which may never occur, or until it is cancelled.

As discussed above, order submission in the automated trading system depends, for example, on the price of the underlying security, which is liable to change frequently. Thus, if the automated trading system makes an option trade, the trader may wish to hedge the risk associated with underlying price movement. This risk, commonly called delta risk, may be quantified using mathematical models. These models may be similar to, or the same as, the models used for determining theoretical option prices using input variables (1)-(7) discussed above. The option lot size (shares per option contract) and number of option contracts traded are typically factored into the hedging decision. The option lot size is typically defined by the options exchange when the contract is created and changed only under special circumstances, such as capital adjustments. The number of options that the trader has bought or sold is included in the confirmation notice transmitted from the options exchange. Accordingly, assuming a total delta hedge is desired, a trader may determine the number of shares of the underlying security to be bought or sold after each option trade based on: (1) mathematical models, including price of the underlying security, (2) options per contract and (3) number of options traded.

As noted above, the price of the underlying security may be defined in several different ways. A typical hedging response of an option trade will be to buy or sell the underlying security. Specifically, buying (selling) calls and selling (buying) puts will usually lead to selling (buying) the underlying for delta hedging. Since the trader will need to sell (buy) the underlying to hedge the delta risk, he may be most interested in the bid (ask) price of the underlying security. While delta risk is referred to specifically, it should be understood that the automated hedging feature might be used to hedge other known risks. For example, automated hedging may be used to hedge the vega risk, the risk of a position or trade due to price changes of the options arising from changes of an option's volatility.

From a trading perspective, the trader must define how and to what extent to delta hedge. Obviously, a trader must first decide whether he wants to delta hedge manually, or automatically. In either case, he must consider two opposing dynamics: (1) speed of executing the underlying security orders, and (2) execution price of the underlying security orders. Typically, a trader may choose to hedge using market orders if she is most concerned about speed of execution, or limit orders if she is most concerned about the price at which the underlying orders are executed. As described above, entering a market order will (nearly) always result in the desired quantity being executed, but at potentially unfavorable or unexpected prices. Conversely, entering a limit order will always result in executed prices which meet certain criteria (i.e., greater than or equal to limit price if selling, and less than or equal to the limit price if buying), but only some or none of the desired quantity may actually be executed.

The trader may assess several qualitative factors in deciding whether to automatically hedge and, if so, whether to use market orders or limit orders. Some of the qualitative factors include the quantity of delta hedge underlying trade relative to the depth of the entire underlying market, volatility of the underlying market, the size of the underlying bid-ask price spread relative to the price of the underlying, and the amount of mental attention the trader can give toward the delta hedge trade. Different traders trading options on different underlying securities may opt for different hedging methods. Thus, in one embodiment of the automatic option trading system of the present invention, the trader may choose manual hedging, automatic hedging using market orders, or automatic hedging using limit orders.

The automatic hedging software may be resident on one or more of the trader stations 230, a backend computer 220, 223, 225, or other equipment of the trader site 200. One embodiment of the automated hedging system will be described in connection with FIG. 7. Backend computer 220 receives option trade confirmations from exchange site 1100 based on an order submitted automatically by backend computer 225. Alternatively, or in addition, backend computer 225 may receive option trade confirmations from the exchange site 100. Further, the option trade confirmations may correspond to orders submitted either automatically or manually by a trader. Backend computer 220 routes the trade confirmation to a trader station 230 that is associated with the automatic option trade made by the backend computer 225.

If a manual hedge feature has been selected, trader station 230 displays the appropriate hedge action based on factors previously entered by the trader. For example, the trader may see a message such as "buy 4500 shares" of the underlying security. If automatic hedging using the market order has been selected, trader station 230 automatically submits a market order, for example to buy 4500 shares at the market prices, to exchange site 700 via backend computer 223. At the exchange site 700, the market order will (nearly) always be immediately filled by buying 4500 shares, albeit at a potentially unexpected or undesirable average price for those shares.

If automatic hedging using a limit order has been selected, trader station 230 automatically submits an order, for example to buy 4500 shares at a price of 68.05, to exchange site 700 via backend computer 223. The specific limit price submitted depends on the current underlying market and trader definable (a priori) as, perhaps, either: (1) current ask price, since she is buying, (2) average of current bid and ask price, or (3) last traded price. Depending on the market conditions, exchange site 700 may not be able to match the limit order immediately, if ever. Exchanges typically enable the trader to modify or delete partially matched or completely unmatched limit orders. In some cases, the exchange site through which the underlying security is traded may depend on the option traded. For example, both futures of an equity index (e.g. Standard and Poor's 500) and options on the same equity index may be traded through exchange site 100. A stock may be traded through exchange site 700, but options for the stock may be traded through exchange site 100. In such a case, the system configurations at either the trader station 230 performing hedging or other equipment at trader site 200 must ensure that hedge orders are routed to the appropriate exchange.

While the above-embodiments have been described in terms of look-up arrays or tables, it should be understood that data may include or be maintained in other organizational memory constructs consistent with the present invention, for example, linked lists, trees, heaps, hash lists, or some combination, or any other data structure or combinations of data structures useful in implementing a search algorithm. In addition, the trader site 200 is described as submitting orders to the exchange site 100 using the automated trading system. However, the trader site 200 may submit its "order" in the form of a quote to the exchange site, where the bid (ask) price of the quote corresponds to the theoretical buy (sell) price if, say, the trader wanted to buy (sell) the item.

It will be apparent to those skilled in the art that various modifications and variations can be made without departing from the scope or spirit of the invention. For example, the present invention may be applied in areas other than electronic securities, for example, the purchase and/or sale of goods or services, contests, auctions, and other applications in which fast, accurate responses are desirable. Other embodiments of the invention will be apparent to those skilled in the art from consideration of the specification and practice of the invention disclosed herein. It is intended that the specification and examples be considered as exemplary only, with a true scope and spirit of the invention being indicated by the following claim.

What is claimed is:

1. An automated trading system for use in an electronic exchange system network, comprising:
   a receiver interface that receives market price information for a first traded item from an exchange;
   data reference logic that outputs a transaction value for the first traded item from a data structure based on price information for a second traded item related to the first traded item;
   decision logic using at least a portion of the received market price information and the transaction value to generate a decision whether to submit an order for the first traded item; and
   an output interface for outputting a request for market transaction for one of the first traded item and the second traded item for transmission to the exchange in response to said decision logic.

2. The automated trading system according to claim 1, wherein data reference logic receives current price information for the second traded item and uses the current price information to output the transaction value.

3. The automated trading system according to claim 2, wherein said data reference logic comprises:
memory storing the data structure, wherein the data structure maps pre-calculated transaction values of the first traded item over a range of price values of the second traded item; and
reference logic for identifying one of the pre-calculated transaction values based at least in part on a current price value for the second traded item.

4. The automated trading system according to claim 3, wherein the data structure is a two-dimensional data structure mapping pre-calculated transaction values of the first traded item over a range of prices of the second traded item.

5. The automated trading system according to claim 3, wherein the data structure is an n-dimensional data structure, where n is 3 or more.

6. The automated trading system according to claim 3, wherein the data structure is a look-up table.

7. The automated trading system according to claim 3, wherein the data structure comprises a linked list.

8. The automated trading system according to claim 3, wherein the data structure comprises a tree structure.

9. The automated trading system according to claim 1, said decision logic compares at least a portion of the received market price information to the transaction value when automated trading in the first item first becomes enabled.

10. The automated trading system according to claim 1, further comprising safety check logic, responsive to said decision logic, to prevent transmission of a request for market transaction for the first traded item to the exchange if the request does not meet a predetermined criterion.

11. The automated trading system according to claim 10, where the predetermined criterion is maximum trade quantity for the first traded item.

12. The automated trading system according to claim 10, wherein said predetermined criterion is a maximum number of market transaction attempts within a predetermined period of time and said decision logic compares at least a portion of the received market price information to the transaction value when the maximum number of attempts is increased.

13. The automated trading system according to claim 1, where the receiver interface receives the market price information for the first traded item indirectly from the exchange via an exchange interface.

14. The automated trading system according to claim 1, wherein the decision logic compares the transactional value to at least a portion of the received market price information.

15. The automated trading system according to claim 14, wherein the transaction value is a minimum sell price for the first traded item, and the market price information includes a market bid price for the first traded item.

16. The automated trading system according to claim 14, wherein the transaction value is a maximum buy price for the first traded item, and the market price information includes a market ask price for the first traded item.

17. The automated trading system according to claim 14, wherein the transactional value is a theoretical value of the first traded item based on a mathematical model.

18. The automated trading system according to claim 14, wherein the price information for the second traded item corresponds to a current market price for the second traded item and said decision logic generates a comparison when the current market price for the second traded item changes.

19. The automated trading system according to claim 14, wherein said price information for the second traded item corresponds to a current market price for the second traded item and said decision logic generates a comparison when the price information for the first traded item changes.

20. The automated trading system according to claim 1, wherein a backend computer includes said receiver interface, said data reference logic, said decision logic, and said output interface and said first backend computer operates using a Windows-based operating system.

21. The automated trading system according to claim 1, wherein a backend computer includes said receiver interface, said data reference logic, said decision logic, and said output interface and said first backend computer operates using a text-based operating system.

22. The automated trading system according to claim 21, further comprising a trader station separate from said backend computer, said trader station coupled to said backend computer through a communication link, said trader station including a graphic user interface to enable a trader to monitor the operation of said backend computer.

23. The automated trading system according to claim 22, wherein said trader station transmits updated data reference information for updating said data reference logic to said backend computer over the communication link.

24. The automated trading system according to claim 23, wherein said decision logic compares at least a portion of the received market price information to the transaction value when the data reference information is updated.

25. The automated trading system according to claim 23, wherein said trader station calculates the updated data reference information and the backend computer stores the calculated updated data reference information.

26. The automated trading system according to claim 22, wherein said backend computer is located substantially closer than said trader station to the exchange that transmits the market price information for the first traded item.

27. An automated trading method for use in an electronic exchange system network, comprising:
using equipment to perform trading of a first traded item or a second traded item related to the first traded item, including:
receiving market price information for the first traded item;
identifying a desired price for the first traded item in a look-up table based on price information for the second traded item;
comparing the received market price information for the first traded item to the desired price for the first traded item; and
generating an order for one of the first traded item and the second traded item based on the comparison of the received market price information to the desired price.

28. The automated trading method according to claim 27, wherein said first traded item corresponds to an option and the second traded item corresponds to a security underlying the option.

29. The automated trading method according to claim 27, wherein said step of identifying a desired price, comprises:
(a) receiving current market price information for said second traded item;
(b) using said current market price information for said second traded item to index a desired price for said first traded item in said look-up table.

30. The automated trading method according to claim 27, wherein said look-up table comprises a two-dimensional table providing desired price values indexed by item traded and price of the second traded item.

31. The automated trading method according to claim 27, wherein said look-up table comprises an n-dimensional table, where n is 3 or more.

32. An automated method of trading in an exchange system network, comprising:
    using equipment to perform trading of an option including:
        receiving a current market price for the option from an exchange;
        comparing the current market price for the option with a desired price for the option, said desired price derived from current price information for an underlying security for the option; and
        submitting an order for the option to the exchange within 1 millisecond of the step of receiving the current market price.

33. The automated trading method according to claim 32, wherein said step of submitting an order is performed within 600 microseconds of the step of receiving the current market price.

34. The automated trading method according to claim 33, wherein said step of submitting an order is performed within 380 microseconds of the step of receiving the current market price.

35. The automated trading method according to claim 34, wherein said step of submitting an order is performed within 250 microseconds of the step of receiving the current market price.

36. An automated trading method for use in an exchange system network, comprising:
    using equipment in a network architecture to perform trading of a first traded item including:
        receiving market information for the first traded item;
        identifying a transaction value for the first traded item in a look-up table of transaction values for the first traded item, wherein the identifying is responsive to receiving the market information for the first traded item and wherein the transaction values in the look-up table are based on price information for a second traded item related to the first traded item; and
        using at least the identified transaction value in determining whether to submit an order for the first traded item.

37. The automated trading method according to claim 36, wherein the identified transaction value is a volatility value corresponding to the first traded item.

38. The automated trading method according to claim 36, wherein the identified transaction value is a maximum buy value for the first traded item.

39. The automated trading method according to claim 36, wherein the identified transaction value is a minimum sell value for the first traded item.

40. The automated trading method according to claim 36, wherein the identified transaction value is a theoretical value for the first traded item generated based on a mathematical model.

41. The automated trading method according to claim 36, wherein the look-up table comprises a linked list.

42. The automated trading method according to claim 36, wherein a backend computer performs the receiving, identifying, and using steps on a Windows-based operating system.

43. The automated trading method according to claim 36, wherein a backend computer performs the receiving, identifying, and using steps on a text-based platform.

44. The automated trading method according to claim 36, wherein:
    (a) a backend computer performs the receiving, identifying, and using steps,
    (b) a trader station separate from said backend computer calculates transaction values for storage in the look-up table and transmits the calculated transaction values to the backend computer, and
    (c) the backend computer stores the calculated transaction values in the look-up table.

45. The automated trading method according to claim 44, further comprising the steps of checking values stored in the look-up table of the backend computer with values stored in a look-up table in said trader station to confirm the accuracy of the look-up table stored in the backend computer.

46. The automated trading method according to claim 36, further comprising the steps of:
    (a) submitting an order for the first traded item;
    (b) receiving confirmation of a transaction from an exchange responsive to the order submitted; and
    (c) submitting an order for the second traded item to hedge a delta risk associated with the confirmed transaction.

* * * * *